(12) United States Patent
Haskins

(10) Patent No.: US 7,778,907 B1
(45) Date of Patent: Aug. 17, 2010

(54) METHOD AND SYSTEM FOR ESTABLISHING, MONITORING, AND RESERVING A GUARANTEED MINIMUM VALUE RETURN ON SELECT INVESTMENTS

(75) Inventor: Charles R. Haskins, Wyoming, DE (US); Marilyn Haskins, legal representative, Wyoming, DE (US)

(73) Assignee: Metropolitan Life Insurance Co., Long Island City, NY (US)

( * ) Notice: Subject to any disclaimer, the term of this patent is extended or adjusted under 35 U.S.C. 154(b) by 0 days.

(21) Appl. No.: 09/381,243

(22) PCT Filed: Mar. 17, 1998

(86) PCT No.: PCT/US98/03800

§ 371 (c)(1),
(2), (4) Date: Jan. 21, 2000

(87) PCT Pub. No.: WO98/41941

PCT Pub. Date: Sep. 24, 1998

(51) Int. Cl.
*G06Q 40/00* (2006.01)

(52) U.S. Cl. .................................. 705/36 R; 705/35

(58) Field of Classification Search ............ 705/35–37, 705/38, 39; 340/347; 364/710–717
See application file for complete search history.

(56) References Cited

U.S. PATENT DOCUMENTS

| | | | | |
|---|---|---|---|---|
| 3,634,669 A | * | 1/1972 | Soumas et al. ............ 705/36 R |
| 4,689,606 A | * | 8/1987 | Sato ............................. 380/46 |
| 4,698,783 A | * | 10/1987 | Nishimuro et al. ............ 368/10 |
| 4,933,842 A | * | 6/1990 | Durbin et al. ............ 705/36 R |
| 4,969,094 A | * | 11/1990 | Halley et al. ................. 364/408 |
| 5,126,936 A | | 6/1992 | Champion et al. .......... 364/408 |
| 5,132,899 A | | 7/1992 | Fox ............................. 364/408 |
| 5,214,579 A | * | 5/1993 | Wolfberg et al. ............ 364/408 |
| 5,251,165 A | * | 10/1993 | James, III .................... 708/250 |
| 5,644,727 A | | 7/1997 | Atkins ......................... 395/240 |
| 5,712,984 A | * | 1/1998 | Hammond et al. ............. 705/4 |
| 5,761,442 A | | 6/1998 | Barr et al. .................... 395/236 |

(Continued)

OTHER PUBLICATIONS

Lane, M. et al.; Designing Investments Strategies for Fixed-Income Portfolios; in External Methods and System Analysis; ed. b Franco, Av. et al.; Springer-Verlag; 1980; pp. 98-126.*

(Continued)

*Primary Examiner*—Narayanswamy Subramanian
(74) *Attorney, Agent, or Firm*—Troutman Sanders LLP

(57) ABSTRACT

The present invention provides a method and system for assuring a minimal guaranteed return on long-term investments, such as mutual funds or variable annuities. The invention includes a method and system for pricing, administration, customer presentation, and reserving relating to the guaranteed minimum return assurance. In addition, the present invention includes a method and system for allowing individual investors to control and easily change their typical asset allocation strategies. In order to accomplish the minimum guaranteed return, the present invention also includes sophisticated projection techniques, such as Monte Carlo simulation of investment performance. The present invention also includes features that allow the tracking of payments and removal of overcontributions from selected accounts, use of reserving techniques, optimizing investment diversification, proposal, issue, and administration of variable annuity riders, such as guaranteed minimum variable income benefit riders and guaranteed minimum income benefit riders, linkable to guaranteed minimum death benefits, and establish a charge for the guarantee.

14 Claims, 30 Drawing Sheets

U.S. PATENT DOCUMENTS

| | | | | |
|---|---|---|---|---|
| 5,784,696 | A | * | 7/1998 | Melnikoff .................. 705/36 R |
| 5,812,987 | A | * | 9/1998 | Luskin et al. ............. 705/36 R |
| 5,884,287 | A | * | 3/1999 | Edesess ..................... 705/36 R |
| 6,064,985 | A | * | 5/2000 | Anderson ..................... 705/36 |
| 6,275,814 | B1 | * | 8/2001 | Giansante et al. ......... 705/36 R |
| 6,336,102 | B1 | * | 1/2002 | Luskin et al. ................. 705/35 |
| 7,016,873 | B1 | * | 3/2006 | Peterson et al. ........... 705/36 R |
| 7,127,423 | B2 | * | 10/2006 | Dunning et al. ........... 705/36 R |
| 2005/0125318 | A1 | * | 6/2005 | Jameson ....................... 705/30 |
| 2006/0294312 | A1 | * | 12/2006 | Walmsley ................... 711/122 |
| 2007/0244777 | A1 | * | 10/2007 | Torre et al. .................... 705/35 |

OTHER PUBLICATIONS

Lewellen, W.G.; Simulation versus Single-Value estimates in capital expediture analysis; in Modern Developments in Financial Management; ed. by Myers, S.C.; The Dryden Press, -Praeger Publishing, Inc.; 1976; pp. 442-463.*

Halloran, J.A.; Introduction to Financial Management, Scott, Foresman & Co.; 1985 p. G-7.*

Martin, J.D. et al.; Basic Financial Management; 5th ed.; Prentice-Hall, Inc.; 1991, p. 214.*

International Search Report for PCT/US98/03800, dated Aug. 24, 1998.

Tyson, Eric. "These program can help you pick the best funds to squirrel away", Money, Aug. 19, 1996, vol. 25, No. 8, p. 19. (Source: Dialog, 1998).

Anonymous. Asset Allocation Programs: "A partnership between operations and investments", ABA's Financial Services Industry Trends, Jan./Feb. 1996, vol. 54, pp. 15-18. (Source: Dialog, 1998).

Anonymous. "Investing through mutual funds: A small way to allocate assets and diversify", Financial Independence, Jan./Feb. 1994, p. 6. (Source: Dialog, 1998).

PCT Application as Published by WIPO No. WO 98/41941, Sep. 24, 1998.

* cited by examiner

Projection Method 1

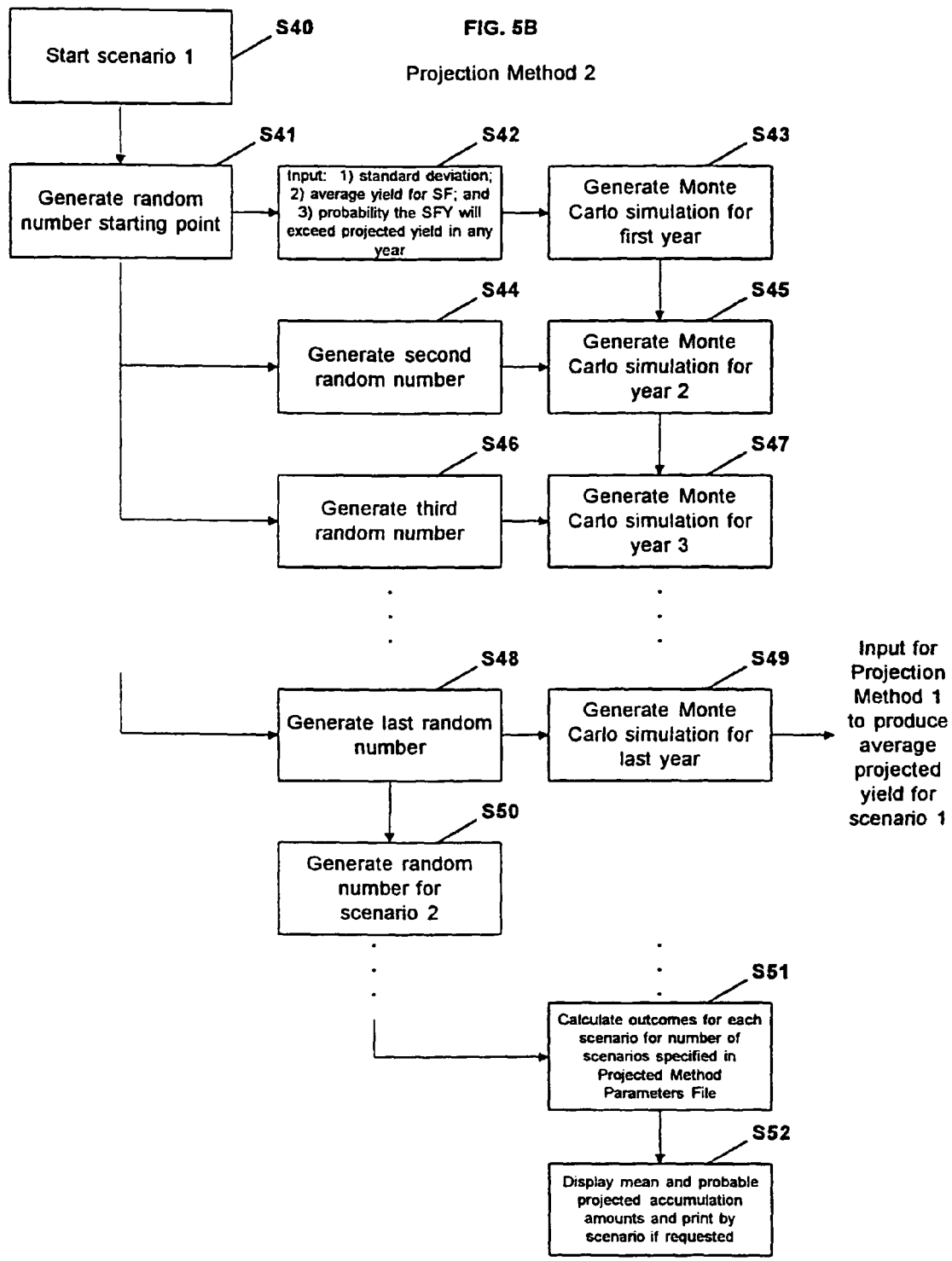

Projection Method 3

Projection Method 4

Projection Method 5

VA Projection Method 1

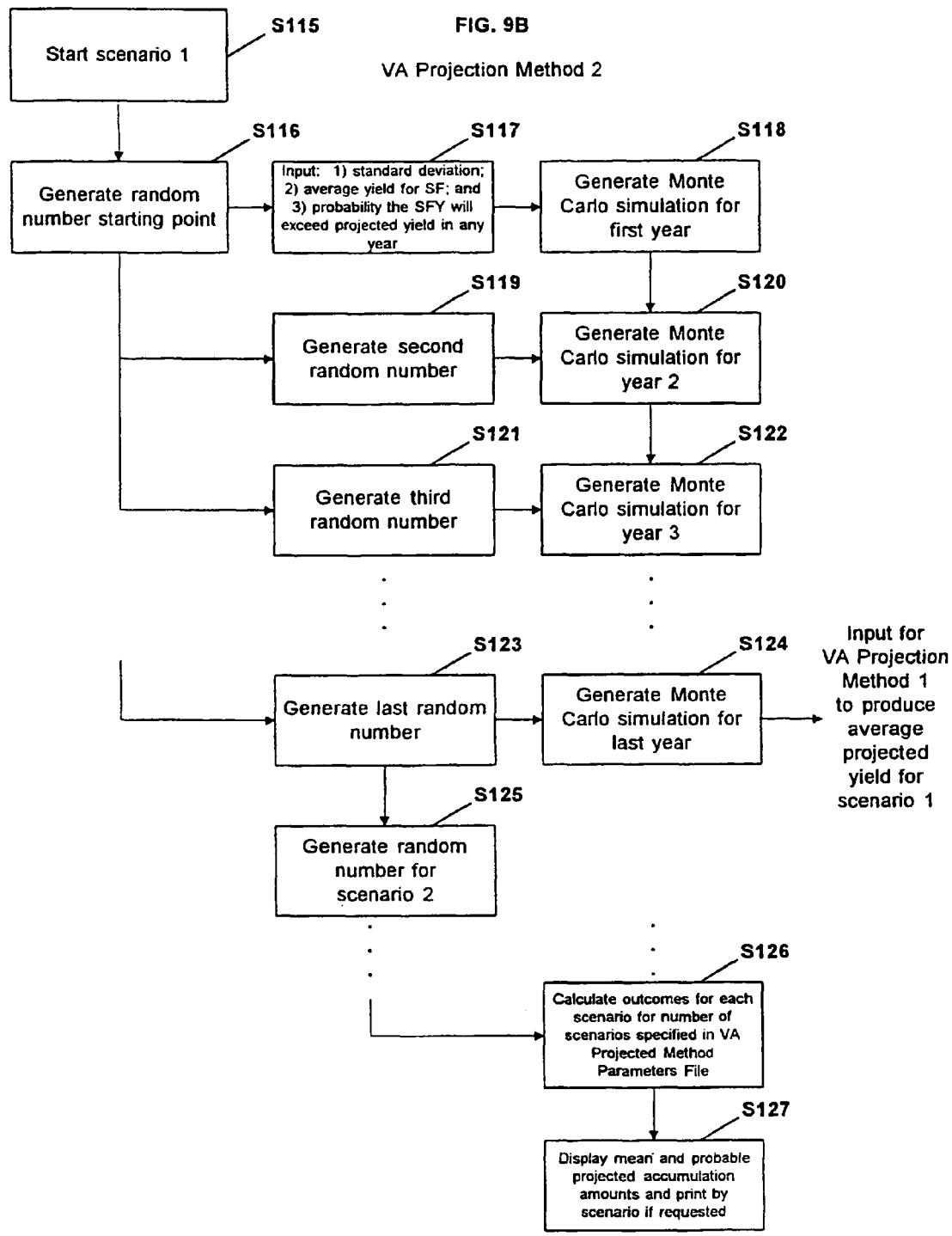

VA Projection Method 3

VA Projection Method 4

VA Projection Method 5

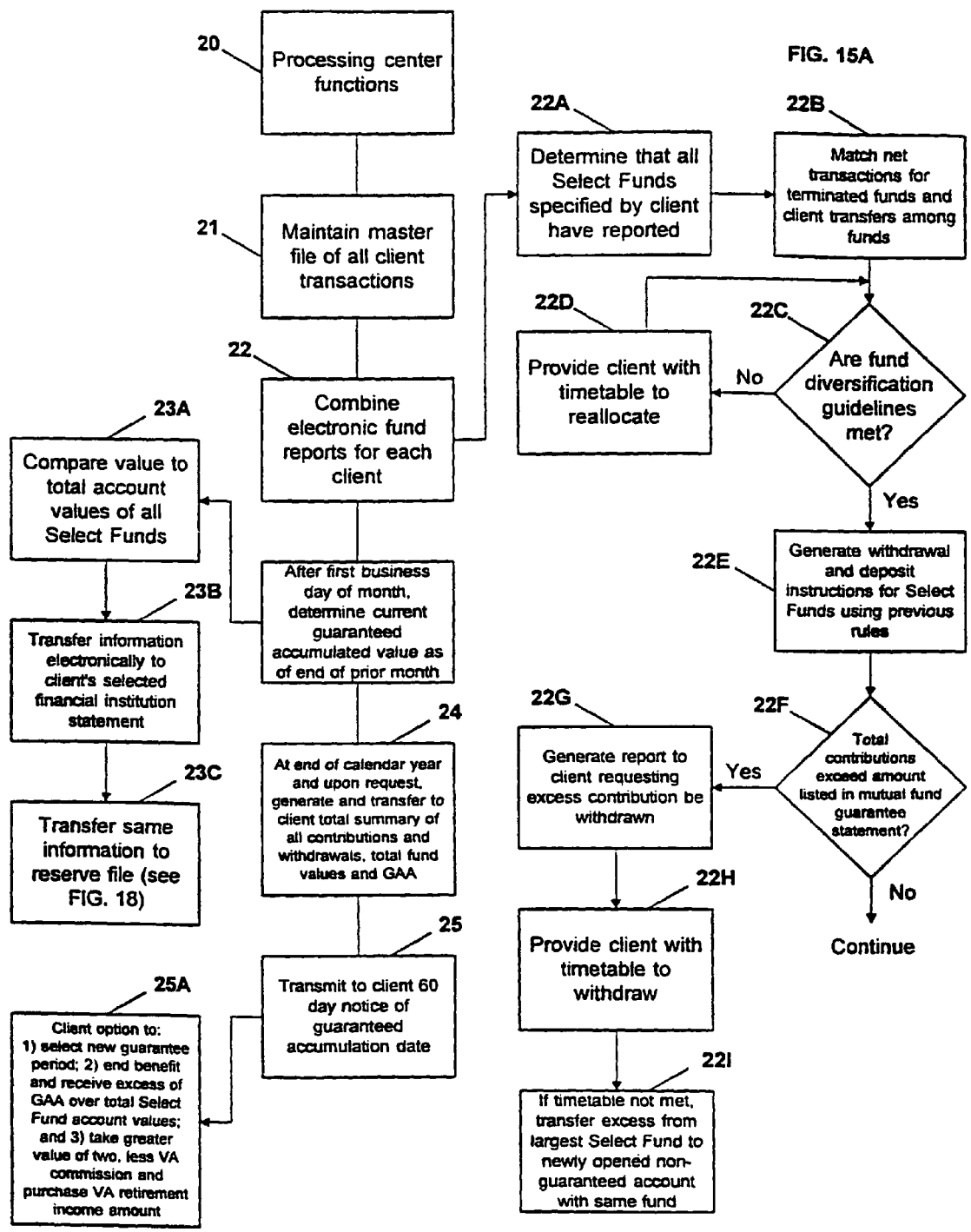

Reserve Method 1

Reserve Method 2

Reserve Method 3

FIG. 18D

Reserve Method 4

S275

(Used only for VA Benefit)
Use industry standard valuation
of VA benefits described in
proposed NAIC valuation
guideline XXXIII

METHOD AND SYSTEM FOR ESTABLISHING, MONITORING, AND RESERVING A GUARANTEED MINIMUM VALUE RETURN ON SELECT INVESTMENTS

FIELD OF THE INVENTION

The present invention relates to a method and system for providing a minimal guaranteed return on a long-term investment and the pricing, administration, customer presentation, and reserving for this minimum guarantee. In particular, the present invention relates to a method and system for allowing individual investors to control and change easily their typical asset allocation strategies. In addition, the present invention relates to a system that allows guarantee of minimum return using sophisticated projection techniques. In accomplishing this minimum guarantee, the present invention includes a methodology for diversifying retirement investment, particularly using mutual fund and variable annuity separate account fund investments, variable annuity riders, and a predetermined guarantee charge.

BACKGROUND OF THE INVENTION

As a client approaches "middle age" (generally 45 to 60 years of age), asset allocation recommendations for long-term investments have consistently been to shift an increasingly larger percentage of total investments to bonds or bond mutual funds. As a result, current retirement products have guaranteed rates over these extended periods of between 3% and 4%. No existing system provides a minimum guaranteed annual return, such as 5%, on a long term investment of mutual funds or separate accounts within variable annuities.

Further, existing art does not provide sophisticated projection and modeling techniques, such as Monte Carlo simulation to assist with assuring a guaranteed annual return.

Existing art for long-term investment includes U.S. Pat. No. 4,750,121 to Halley, et al., U.S. Pat. No. 5,126,936 to Champion, et al., and U.S. Pat. No. 5,214,579 to Wolfberg, et al. The invention of Halley, et al., provides an improved pension benefits system for enrolled employees using a master trust institution and a life insurer institution. The master trust institution receives periodic payments from employees, purchases a life insurance institution for each employee, invests in available securities, provides future projections of periodic benefits, receives life insurance proceeds, and distributes all periodic payable benefits. In order to assure a guaranteed rate of return on securities, the system invests in securities, such as Federally backed securities, that provide a guaranteed rate of return. The system determines expected income using employee income, purchased life insurance, the guaranteed rate of return securities, and life expectancy of the employees. As a result, income is relatively easily calculable, as only the life expectancy of employees is non-determinative.

Halley, et al., does not contain a method and system for guaranteeing a higher rate of return than typically provided by Federally backed securities. It does not contain sophisticated modeling techniques such as Monte Carlo simulation to provide projections of fund performance. It does not allow investor control and modification of investment selections. It does not provide a method and system for diversification guidance.

Champion, et al., provides a data processing apparatus and method that controls and implements a goal-directed financial assets management system. The system receives investor deposits at selected levels of correspondence to establish capital markets and automatically adjusts the risk exposure in any asset category to prevent the risk exposure from reaching an excessive level. Using a "market multiple," which specifies the level of correspondence over time between the value of the investor's implied allocation in that asset group and the general market for that asset, the system can guarantee a return corresponding to the market multiple selected. Risk of collective investors is controlled overall by aggregating the market multiples for all of the investors. Use of aggregation reduces transaction costs by allowing offset of buy and sell orders among the investors.

Champion, et al., does not contain a method and system for guaranteeing a high rate of return for individual investors. It does not contain sophisticated modeling techniques such as Monte Carlo simulation to provide projections of fund performance. It does not provide a method and system for diversification guidance.

Wolfberg, et al., provides a data processing system that manages, monitors, and reports the growth in a participant's investment base with respect to progress towards achieving a predetermined target amount selected by the investor. The system monitors and controls a wide variety of financial services, such as check writing, borrowing, and insurance benefits, and the investor's initial investment may be supplemented by monthly investments. The system tracks actual growth of accounts against a predetermined guaranteed minimum rate of return on the investment base. The guaranteed minimum reflects a target date for reaching a target amount given an initial investment and monthly payment. The system uses performance above the predetermined target to produce a surplus for performance below the target.

Wolfberg, et al., does not contain a method and system for guaranteeing a high rate of return for individual investors using sophisticated modeling techniques such as Monte Carlo simulation to project fund performance. It does not provide a method and system for diversification guidance.

SUMMARY OF THE INVENTION

It is an object of the present invention to overcome the limitations of existing art by allowing individual investors to purchase a minimum guaranteed annual return (for example, 5%) on long term investments in mutual funds or separate account funds within variable annuities (VAs). It is a further object of the present invention to include the pricing, administration, customer presentation and reserving for this minimum guarantee.

It is a further object of the present invention to protect financial institutions that provide the guarantee by establishing a mechanism that insures investment diversification, which minimizes the possibility of poor long term investment results.

It is a further object of the present invention to protect the financial institution by tracking payments and removing over-contributions from the selected mutual fund or VA separate accounts that are subject to the minimum guaranteed annual return.

It is a further object of the present invention to provide unique process allowing the individual investor (or "client") and their financial advisor (Investment Counselor or "IC") to drastically change their typical asset allocation strategies. Prior to this process, as a client approached "middle age" (generally 45 to 60 years of age), asset allocation recommendations have consistently shifted an increasingly larger percentage of total investments to bonds or bond mutual funds. With the present invention, the client can elect to maintain a large portion of retirement savings in equity mutual funds and gradually increase the percentage of mutual funds or VA separate account funds that have a guaranteed minimum annual return.

It is a further object of the present invention to enable clients, for the first time, to establish projected future savings patterns that will produce high guaranteed retirement benefits, for example 5% annual interest guarantees for accumulation periods of 20 years or more and annuity payout periods of up to the retirees lifetime (up to 50+ years). Existing art retirement products have guaranteed rates over these extended periods of between 3% and 4%.

It is a further object of the present invention to allow individual investors, for the first time, to use sophisticated projection techniques to develop a probable range of potential accumulation fund values at retirement and retirement income payout amounts thereafter. In an embodiment of the present invention, the client and IC select from a wide range of potential mutual fund and VA separate account fund options based on a method that maximizes potential returns and provides a probability of achieving specific investment and retirement income returns.

It is a further object of the present invention to allow the financial institution that provides the high guaranteed retirement fund accumulation and retirement benefit guarantees to price and monitor the cost of these promises.

It is a further object of the present invention to use a projection or modeling technique, such as Monte Carlo simulation, to establish the charge for the guarantee and to maintain adequate reserves of the long term life of the guarantees made to the client.

It is a further object of the present invention to use standard reserving techniques applied to the method and system of the present invention create an insurance product or guaranteed benefit different from any prior product or guarantee.

In contrast to the common practice of existing art to tell clients to diversify their retirement investments, it is an object of the present invention to provide a unique method of requiring clients to diversify both their mutual fund and variable annuity separate account fund investments.

It is a further object of the present invention to provide a unique method of actually optimizing investment diversification guidelines. The optimization process is documented for both mutual fund and variable annuity separate account fund investments.

It is a further object of the present invention to allow for the proposal, issue, and administration of a new variable annuity rider entitled guaranteed minimum variable income benefit (GMIVB) rider.

It is a further object of the present invention to allow for a unique proposal, issue and administration of a variable annuity guaranteed minimum income benefit (GMIB) rider. For existing art, riders in this class are linked to the guaranteed minimum death benefit and contain much less favorable guaranteed interest rates during the benefit period. The unique GMIB rider of the present invention does not contain the linkage to the GMDB, which allows for a much more focused and enhanced consumer benefit.

It is a further object of the present invention to allow for the creation of a major new individual investor benefit that provides substantial investment guarantees on mutual funds and VA separate account funds. It is an object of the present invention to provide individual investors with the ability to maximize their retirement savings and retirement benefit returns while maintaining a high safe guaranteed minimum return for their retirement savings and income.

It is an object of the present invention to use Monte Carlo simulation techniques to aid individual investors.

To achieve the stated and other objects of the present invention, as embodied and described below, the invention includes a method for modeling an investment fund mix to produce a projected guaranteed accumulation investment amount for a user over a predetermined time period equal to at least a preselected guaranteed accumulated investment amount selected by the user comprising the steps of designating funds for investment to produce the fund mix; comparing a diversification guideline to the fund mix; completing an information file for the user; determining a pattern of investments to meet the preselected guaranteed amount; applying the diversification guideline to the information file to determine whether the information file meets the guideline; automatically calculating the projected guaranteed amount; and comparing the projected guaranteed amount to the preselected guaranteed accumulated investment amount.

To achieve the stated and other objects of the present invention, as embodied and described below, the invention further includes a method for identifying a fund mix producing a projected accumulation investment amount exceeding a preselected amount for a user comprising the steps of inputting a time period for producing the maximum accumulation investment amount; inputting a probability of the projected accumulation investment amount exceeding the preselected amount; automatically searching predetermined probability distributions for potential funds for the fund mix; automatically listing a plurality of potential funds by projected accumulation investment amount produced using the predetermined probability distributions for the potential funds; comparing a diversification guideline to the plurality of potential funds; and automatically combining a plurality of potential fund meeting the diversification guideline to produce an optimum fund mix that will produce a projected accumulation investment amount exceeding the preselected amount.

To achieve the stated and other objects of the present invention, as embodied and described below, the invention further includes a method for projecting an accumulated investment amount for a portfolio having a plurality of funds over a preselected time period for a user, comprising the steps of inputting initial and periodic contributions and fund allocations for the plurality of funds; completing a projection method parameters file in which various parameters are identified, including parameters set by the user based upon investment goals selected by the user; and automatically performing a projection of the accumulated investment amount for the portfolio having the plurality of funds.

To achieve the stated and other objects of the present invention, as embodied and described below, the invention further includes a method for pricing fund charges for an investment fund equal to at least a preselected guaranteed accumulation investment amount over a predetermined time period selected by a user comprising the steps of creating a plurality of information sets corresponding to a plurality of potential users; automatically projecting a plurality of monthly charges for producing a plurality of projected guaranteed accumulation investment amounts for each of the plurality of information sets; automatically deducting and accumulating the plurality of monthly charges; for each of the plurality of projected guaranteed accumulation investment amounts, automatically adding the accumulated monthly charge and subtracting the projected guaranteed accumulation investment amount to produce a probability distribution providing a range of net values; and selecting one from the plurality of monthly charges that produces zero value for the probability and distribution produced.

To achieve the stated and other objects of the present invention, as embodied and described below, the invention further includes a method for processing a selected guaranteed accumulation investment amount for a user over a predetermined time period equal to at least a preselected guaranteed accumulated investment amount selected by the user comprising the steps of inputting a plurality of funds each of the plurality of funds having a value; automatically generating a fund guarantee statement; automatically generating a probability distribution of projected accumulation amounts; automatically deducting a charge on a periodic basis; and automatically generating an electronic fund report. To achieve the stated and other objects of the present invention, as embodied and described below, the invention further includes a method for combining electronic fund reports for a client for a plurality of funds and a plurality of transactions for the plurality of funds wherein each of the plurality of funds has an amount, comprising the steps of automatically determining whether all of the plurality of funds have reported; automatically matching the plurality of transactions to the plurality of funds; determining whether diversification guidelines are met for the plurality of funds and plurality of transactions; automatically generating withdrawal and deposit instructions for the plurality of funds; and automatically determining whether the total contributions exceed a predetermined amount.

To achieve the stated and other objects of the present invention, as embodied and described below, the invention further includes a method for processing for a user a guaranteed accumulation investment amount for a plurality of variable annuities with a fixed retirement income guaranteed amount having a maturation date comprising the steps of inputting user specific data; automatically generating a proposal for a guaranteed minimum benefit rider; automatically generating a contract data page; automatically issuing a contract with a guaranteed minimum income benefit rider; automatically deducting a daily cost charge; receiving transactions for the account; comparing a variable annuity diversification guideline to the received transactions for the account; automatically generating withdrawal and deposit instructions for the received transactions; automatically determining whether the total contributions exceed a predetermined amount; automatically determining the guaranteed accumulation investment amount; and automatically periodically transmitting information about the account to the user.

To achieve the stated and other objects of the present invention, as embodied and described below, the invention further includes a method for determining a reserve for an investment fund mix producing a guaranteed accumulation investment amount for a plurality of users over a predetermined time period, wherein the investment fund mix includes a plurality of selected funds, each of the plurality of selected funds having a value, comprising the steps of automatically identifying for each of the plurality of users each of the plurality of selected funds for which the value of the selected fund is less than the guaranteed accumulation investment amount; automatically summing the difference between each of the plurality of selected funs for which the value of the selected fund is less than the guaranteed accumulation investment amount for each of the plurality of users to produce a total difference; and automatically increasing the total difference by a reserve factor.

Additional objects, advantages and novel features of the invention will be set forth in part in the description that follows, and in part will become more apparent to those skilled in the art upon examination of the following; these features may also be learned by practice of the invention.

BRIEF DESCRIPTION OF THE DRAWINGS

In the drawings:

FIGS. 5A-5E show block diagrams of various projection methods for an embodiment of the present invention. FIG. 5A contains Projection Method 1 using the average projected yield. FIG. 5B contains Projection Method 2 using probable values based on the probability of Select Fund yields exceeding projected yield for the Select Fund in any one year. FIG. 5C shows Projection Method 3 using probable values based on the probability that Select Funds will exceed the index for the fund in any year. FIG. 5D contains Projection Method 4, which uses probable values based on the probability that Select Funds will exceed the index for the fund in any year, given that the index performance for the first three years are pre-set. FIG. 5E shows Projection Method 5 using probable values based on Select Funds performing the same as the index for the fund in any year, less a set spread.

FIGS. 9A-9E show block diagrams of various projection methods for variable annuity Select Funds for an embodiment of the present invention. FIG. 9A contains variable annuity Projection Method 1 using the average projected yield. FIG. 9B contains variable annuity Projection Method 2 using probable values based on the probability of variable annuity Select Fund yields exceeding projected yield for the variable annuity Select Fund in any one year. FIG. 9C shows variable annuity Projection Method 3 using probable values based on the probability that variable annuity Select Funds will exceed the index for the fund in any year. FIG. 9D contains variable annuity Projection Method 4, which uses probable values based on the probability that variable annuity Select Funds will exceed the index for the fund in any year, given that the index performance for the first three years are pre-set. FIG. 9E shows variable annuity Projection Method 5 using probable values based on variable annuity Select Funds performing the same as the index for the fund in any year, less a set spread.

FIG. 15A is a block diagram overviewing processing center functions for an embodiment of the present invention.

FIGS. 18A-18D present a method for establishing and maintaining reserves for the mutual fund and variable annuity accumulation and cumulative variable annuity retirement income amounts using various reserve methods for an embodiment of the present invention. FIG. 18A contains Reserve Method 1. FIG. 18B presents Reserve Method 2. FIG. 18C shows Reserve Method 3. FIG. 18D is Reserve Method 4.

DETAILED DESCRIPTION

Figure 1:
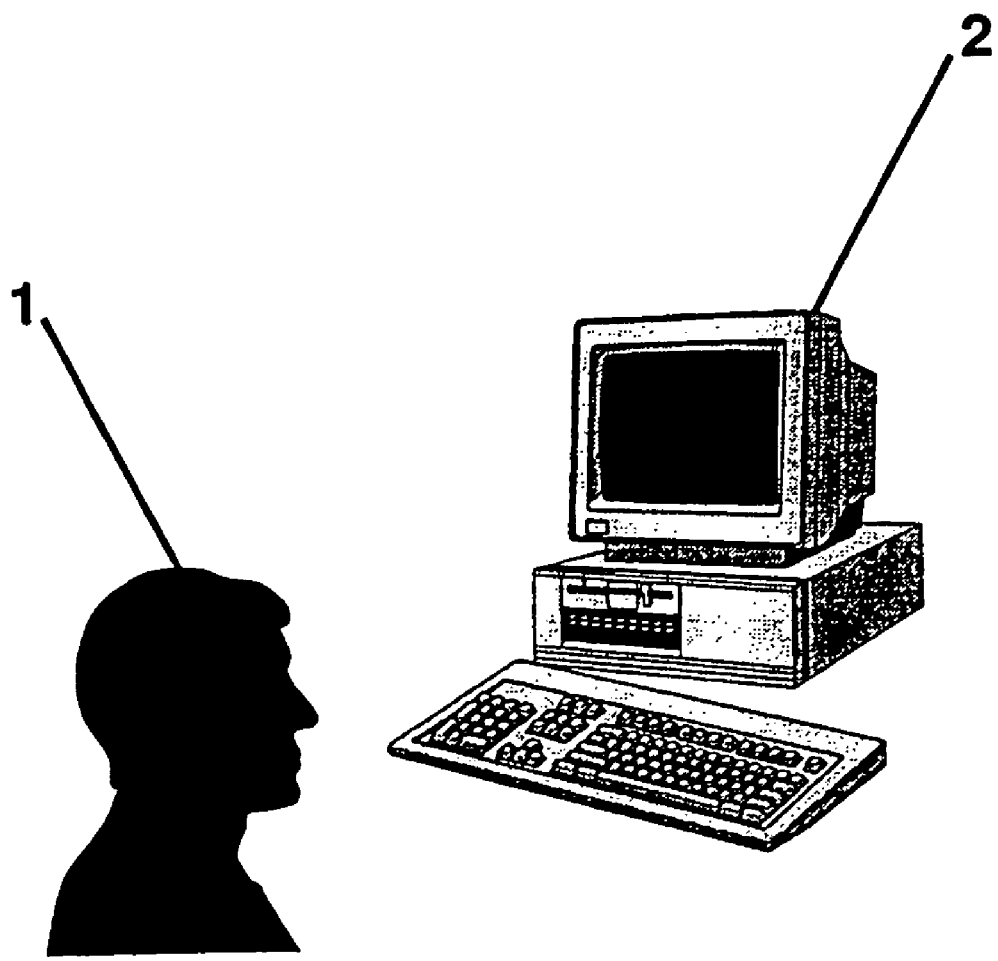
FIG. 1 is an overview of the elements an embodiment of the present invention.

The process of the present allows individual investors to purchase a minimum guaranteed annual return (for example, 5%) on long term investments in mutual funds or separate account funds within variable annuities. The process also includes the pricing, administration, customer presentation and reserving for this minimum guarantee. The process also protects financial institutions that provide the guarantee by establishing a mechanism that insures investment diversification, which minimizes the possibility of poor long term investment results. The process also protects the financial institution by tracking payments and removing over-contributions from the selected mutual fund or variable annuity (VA) separate accounts that are subject to the minimum guaranteed annual return.

This is a unique process that allows the individual investor (or "client") and their financial advisor (Investment Counselor; hereinafter, "IC") to drastically change their typical asset allocation strategies. Prior to this process, as a client approached "middle age" (generally 45 to 60 years of age), asset allocation recommendations have consistently been to shift an increasingly larger percentage of total investments to bonds or bond mutual funds. With this process, the client elects to maintain a large portion of retirement savings in equity mutual funds and gradually increase the percentage of mutual funds or VA separate account funds that have a guaranteed minimum annual return.

This process also enables clients, for the first time, to establish projected future savings patterns that will produce high guaranteed retirement benefits (for example 5% annual interest guarantees for accumulation periods of 20 years or more and annuity payout periods of up to the retirees lifetime (up to 50+ years)). Current retirement products have guaranteed rates over these extended periods of between 3% and 4%.

The process allows individual investors, for the first time, to use sophisticated projection techniques to develop a probable range of potential accumulation fund values at retirement and retirement income payout amounts thereafter. The Monte Carlo simulation techniques contained in this process have been one of the standard methods used to determine probable future outcomes for a wide range of potential risks, but this process is unique in using simulation techniques to aid individual investors. With the present invention, the client and IC select from a wide range of potential mutual fund and VA separate account fund options based on a method that will maximize potential returns and provide a probability of achieving specific investment and retirement income returns.

While it has been common practice to tell clients to diversify their retirement investments, this process contains a unique method of requiring clients to diversify both their mutual fund and VA separate account fund investments. This process contains a unique method of actually optimizing investment diversification guidelines. The optimization process is documented for both mutual fund and VA separate account fund investments.

The process allows the financial institution that provides the high guaranteed retirement fund accumulation and retirement benefit guarantees to price and monitor the cost of these promises. This process uses similar Monte Carlo projection techniques to establish the charge for the guarantee and maintain adequate reserves of the long term life of the guarantees made to the client. These standard reserving techniques are applied in this process to create an insurance product or guaranteed benefit different from any prior product or guarantee.

This process allows for the creation of a major new individual investor benefit that provide substantial investment guarantees on mutual funds and VA separate account funds. Individual investors maximize their retirement savings and retirement benefit returns while maintaining a high safe guaranteed minimum return for their retirement savings and income.

References will now be made to embodiments of the present invention, examples of which are illustrated in the accompanying drawings.

FIG. 1 is an overview of the elements an embodiment of the present invention. A user 1 performs the process of the present invention using a terminal 2, such as a personal computer (PC).

The client and IC first determine retirement savings needs including projected retirement date. The retirement need is an interactive process that involves identifying sources and amounts of retirement income, such as social security, company pension benefits, and other sources of periodic income, such as rental income. There are many retirement planning systems in use that can help clients and IC's define this need.

Using the Flexible Annuity Settlement Proposal Generating System (patent application Ser. No. 08/525,037), an amount of money needed at retirement, based on the monthly income needs of one or more clients is determined. This system is used to calculate the amount of money needed on both a guaranteed and projected basis. For the guaranteed basis, the net investment income is set at a pre-determined level, such as 5%. This is accomplished by setting all of the pricing parameters in the settlement option process, except expected mortality rates, equal to zero. The gross investment rates for each of the duration buckets is set at 5%. The resulting figure is an accumulation amount needed for guaranteed retirement income benefit ("Guaranteed Accumulation Amount"; hereinafter "GAA").

The accumulation vehicles under this process are specified mutual funds ("Select Funds") or specified separate account funds in a VA ("VA Select Funds"). If Select Funds are used, the GAA increases by the sales commission necessary to purchase a single premium immediate annuity. If the sales commission is 3%, the GAA is increased by dividing the figures by (1-3%).

The method for accumulating an investment fund equal to the GAA using Select Funds for an embodiment of the present invention will now be described.

The IC and client review the list of Select Funds using a detailed Select Fund inventory, which includes: 1) fund ID number; 2) fund name; 3) fund investment objective and code; 4) fund manager biography; 5) independent fund rating; 6) annual administrative fees; 7) surrender charge schedule; 8) sales load (if any); 9) projected annual return (net of admin. fees); 10) estimated standard deviation of return; 11) bench mark index; 12) past probability of exceeding index; 13) standard deviation against benchmark index; and 14) if the fund is an asset allocation fund, list the percent allocation to this portion of the fund. Note that asset allocation funds need to be split into "sub funds" or separate Select Funds that are linked. Projections are handled separately, but the results are then combined into the total for the asset allocation fund.

The IC and client designate specific Select Funds for investment within the diversification guidelines. The process will have guidelines concerning both fund diversification and investment objective diversification, contained in the Diversification Guideline File. For fund diversification, no more than x % (for example, 30%) can be invested in any one fund. For investment objective diversification, at least y (for example, three) different investment objectives should be selected, and any one objective should have no more than z % (for example, 50%) of projected investment.

The Diversification Guideline File includes the following information: 1) maximum % investment in any one fund (for example, 30%); 2) minimum number of fund objectives (for example, three); 3) maximum % investment in any fund objective (for example, 50%); and 4) maximum % investment limit for specific fund objectives (list fund objective, maximum total limit, maximum single fund limit) (for example, Sector Fund, 10%, 5%; Country Fund, 10%, 5%; International Fund, 20%, 10%; etc.).

The IC and client then use an interactive process to determine a pattern of investments which will result in achieving the required GAA previously determined. The client and IC complete the client information file (CIF). With information on the CIF the process then calculates a GAA figure and compares this calculated value with the required GAA.

The CIF includes the following information: 1) client number; 2) information included on client file for settlement option process file (name, address, primary and secondary annuitant risk classification, etc.); 3) start date of fund investment guarantee; 4) total initial contribution on start date; 5) total initial fund balance on start date; 6) guaranteed accumulation date (immediate annuity start date); 7) select fund allocation at start date (list of fund name, investment objective, initial fund contribution, or initial fund balance); 8) periodic contribution start date; 9) total amount of periodic contribution; 10) mode of periodic contribution (i.e., monthly, quarterly, semi-annual or annual); 11) date of annual increase in contribution (if any); 12) specify increase as compound %, or flat $ amount; 13) xx %, if increase is compound % (if specified in 12)); 14) $yy amount of mode increase (if specified in 12)); 15) date of last contribution; and 16) Select Fund allocation for periodic payments (list of fund name, investment objective, initial fund contribution, or initial fund balance).

The process checks the CIF to make sure that diversification guidelines are followed. Exceptions are noted and the process stops until corrections are made. The process will then suggest alternative inputs to the CIF which will produce the required GAA. Suggested alternative inputs include: 1) change in initial contribution; 2) change in amount of periodic contribution; 3) change in flat $ or compound % increase in contribution; and 4) re/0 (for example 50%) of the change in amount of periodic contribution specified in 2) (above) combined with ss change in flat $ or compound % increase in contribution.

When the client and the IC have agreed upon a CIF that will result in achieving the GAA, the CIF is printed and saved.

Figure 2:
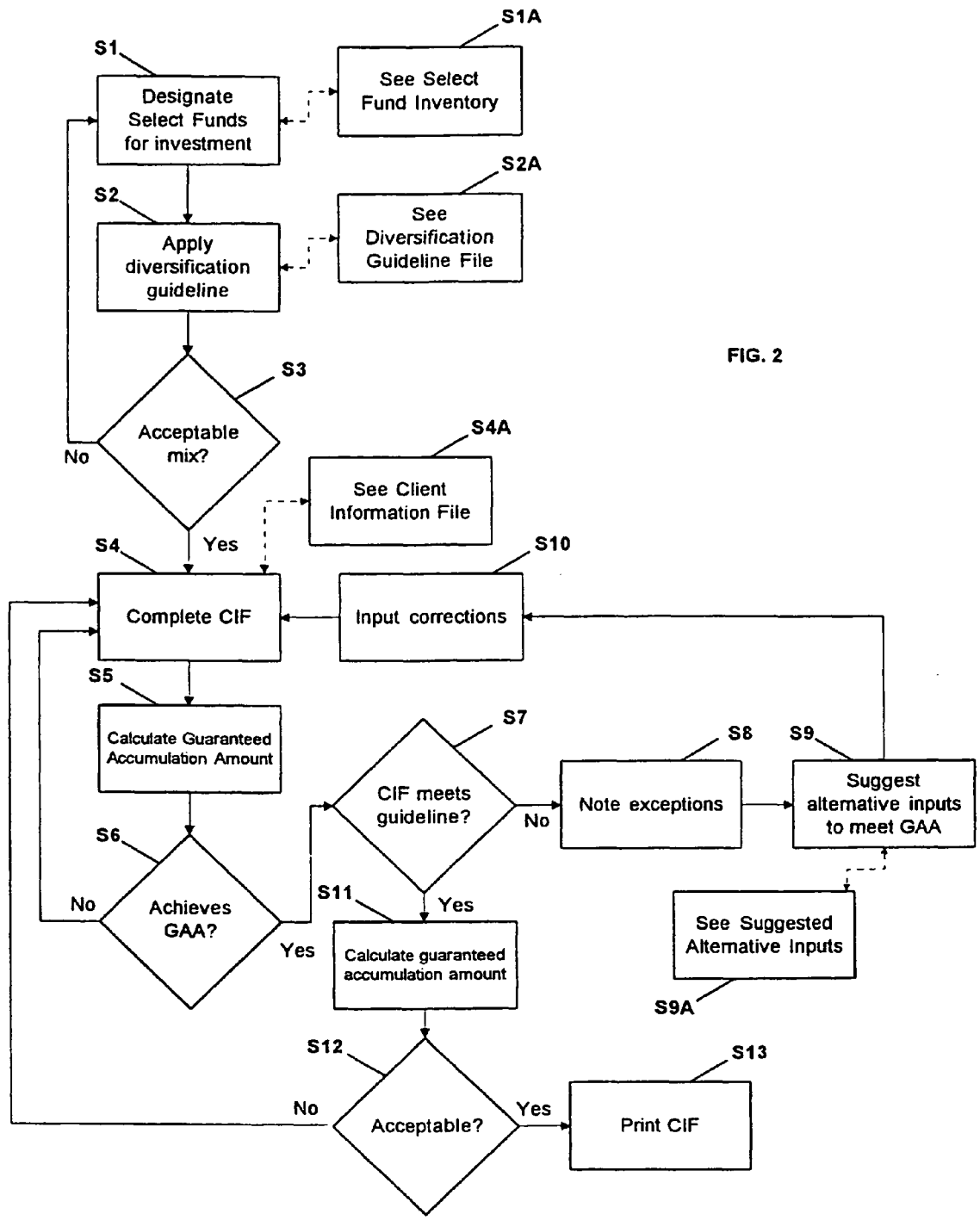
FIG. 2 is a block diagram of a method for accumulating an investment fund equal to the guaranteed accumulation amount using Select Funds for an embodiment of the present invention.

The method for accumulating an investment fund equal to the GAA using Select Funds is detailed in FIG. 2. As shown in FIG. 2, in step S1, Select Funds are designated for investment. These funds are designated using the Select Fund Inventory S1A. In step S2, a Diversification Guideline is applied, using the Diversification Guideline File S2A. In step S3, it is determined whether an acceptable mix of funds for investment has been made. If no, the system returns to step S1. If yes, the system proceeds to step S4.

In step S4, the CIF is completed using the Description Guideline File S4A. In step S5, it is determined whether the CIF meets the diversification guideline. If not, the system proceeds to step S6 to note exceptions. In step S7, suggested alternative inputs to meet the GAA within the guidelines are made. In step S8, corrections are inputted, and the system returns to step S4.

In step S5, if the CIF meets the Diversification guideline, the system proceeds to step S9 to calculate the GAA. In step S10, it is determined whether the GAA is acceptable. If the GAA is not acceptable, the system returns to step S4. If the GAA is acceptable, the system proceeds to step S11 to print the CIF.

The method for suggesting Select Funds producing a maximum projected accumulation amount based on a given probability of success for an embodiment of the present invention will now be described.

In an embodiment of the present invention, projections for each Select Fund are made using single or level contribution patterns for projected accumulation periods from 10 to 20 years. For example, the accumulation pattern could be $10,000 single contribution at issue of the guarantee or a contribution of $1,000 each year.

In an embodiment of the present invention, the projected accumulation value distribution function (using Projection Method 3, described below) for each payment pattern and accumulation period are stored for each Select Fund. As a first step in helping a client, the IC specifies the accumulation period, single contribution or level annual contribution the client needs to make (based on the GAA). The IC and client also specify the probability of the projected accumulation value equaling or exceeding an undetermined amount. For example, the IC and client might specify that they want to solve for a projected accumulation value that has a 70% probability of being achieved.

The Process searches the predetermined probability distributions for all potential Select Funds for the accumulation period and single or level contribution pattern specified. The Select Fund with the highest projected accumulation amount for the particular specified probability is listed, followed by the next highest, until the top 10 Select funds are listed. The process than uses the Select Fund Diversification File to recommend an optimum allocation of contributions to Select Funds and the projected accumulation amount for which the probability of achieving or exceeding the result is equal to the probability specified by the IC and client.

Based on the results of this quick check of all potential Select Funds, in an embodiment of the present invention, the IC and client return to the CIF, input different Select Funds, and repeat the process described in for accumulating an investment fund equal to the GAA using Select Funds.

Figure 3:
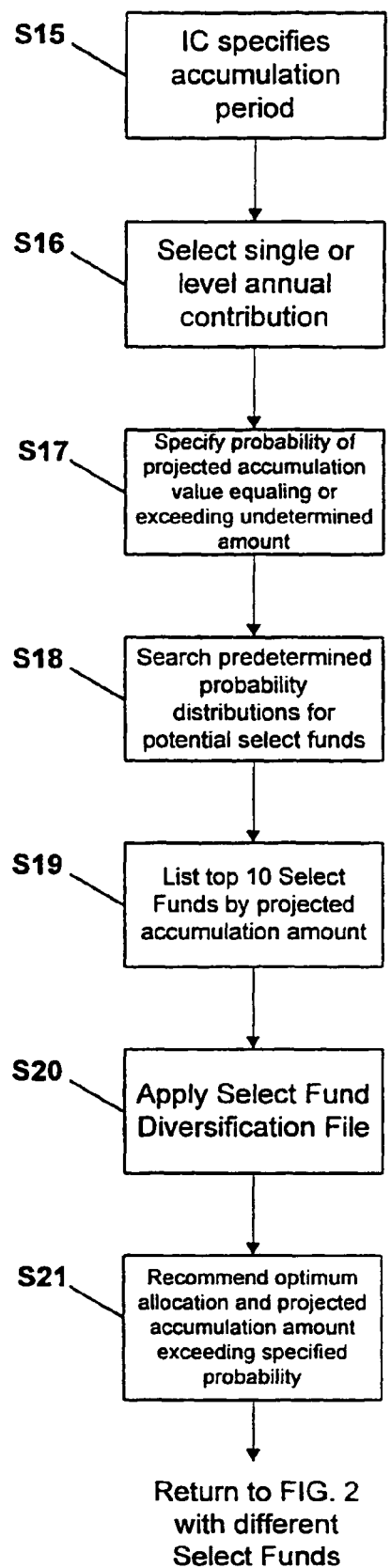
FIG. 3 contains a block diagram of a method for suggesting Select Funds producing a maximum projected accumulation amount based on a given probability of success for an embodiment of the present invention.

The method for suggesting Select Funds producing a maximum projected accumulation amount based on a given probability of success is detailed in FIG. 3. In step S15, the an accumulation period is specified. In step S16, a single or several annual contribution is specified. In step S17, the probability of the projected accumulation value equaling or exceeding an undetermined amount is specified. In step S18, a search is made of predetermined probability distributions for potential select funds.

In step S19, the top 10 Select Funds by projected accumulation amount are listed. In step S20, the Select Fund Diversification File is applied. In step S21, an optimum allocation and projected accumulation amount exceeding the specified probability is recommended. The system then returns to FIG. 2 with different Select Funds produced by the process shown in FIG. 3.

The method for determining the projected accumulation amount using Select Funds for an embodiment of the present invention will now be described.

Using the initial and periodic contributions and Select Fund allocations contained in the CIF the process determines a projected accumulation amount using up to four methods. In an embodiment of the present invention, the IC and client analyze the results and use the projected accumulation amount from the projection method they select. The IC and client first complete a Projection Method Parameters File.

The Projection Method Parameters File includes the following information: 1) probability that Select Funds will exceed index for the fund in any year (for each Select Fund list the index, 5 year history of the fund versus the index, and input the probability that the Select Fund will exceed the index); 2) for indexes used (list the performance over the past 5 years, input estimated performance over the next 3 years); 3) probability that Select Funds will exceed projected yield in any year (for each Select Fund list the average fund yield, actual yield over the past 5 years, and input probability the fund will exceed the average fund yield in the future; 4) projection random number starting point (number between 1 and 99,999); and 5) number of scenario tests per projection (between 100 and 10,000).

When the IC and client have completed the Projection Method Parameters File, the information is stored, and printed, if requested. The IC and client are then prompted to start the projection. Based on the number of Select Funds years to Retirement Date, Number of Scenario Tests per Projection, and the speed of the computer processor unit, an approximate time for completing the projections is given as the first step in the projection. The IC and client can stop the projection at any time. If the process is interrupted, the answers to the projections that have been completed are displayed.

Figure 4:
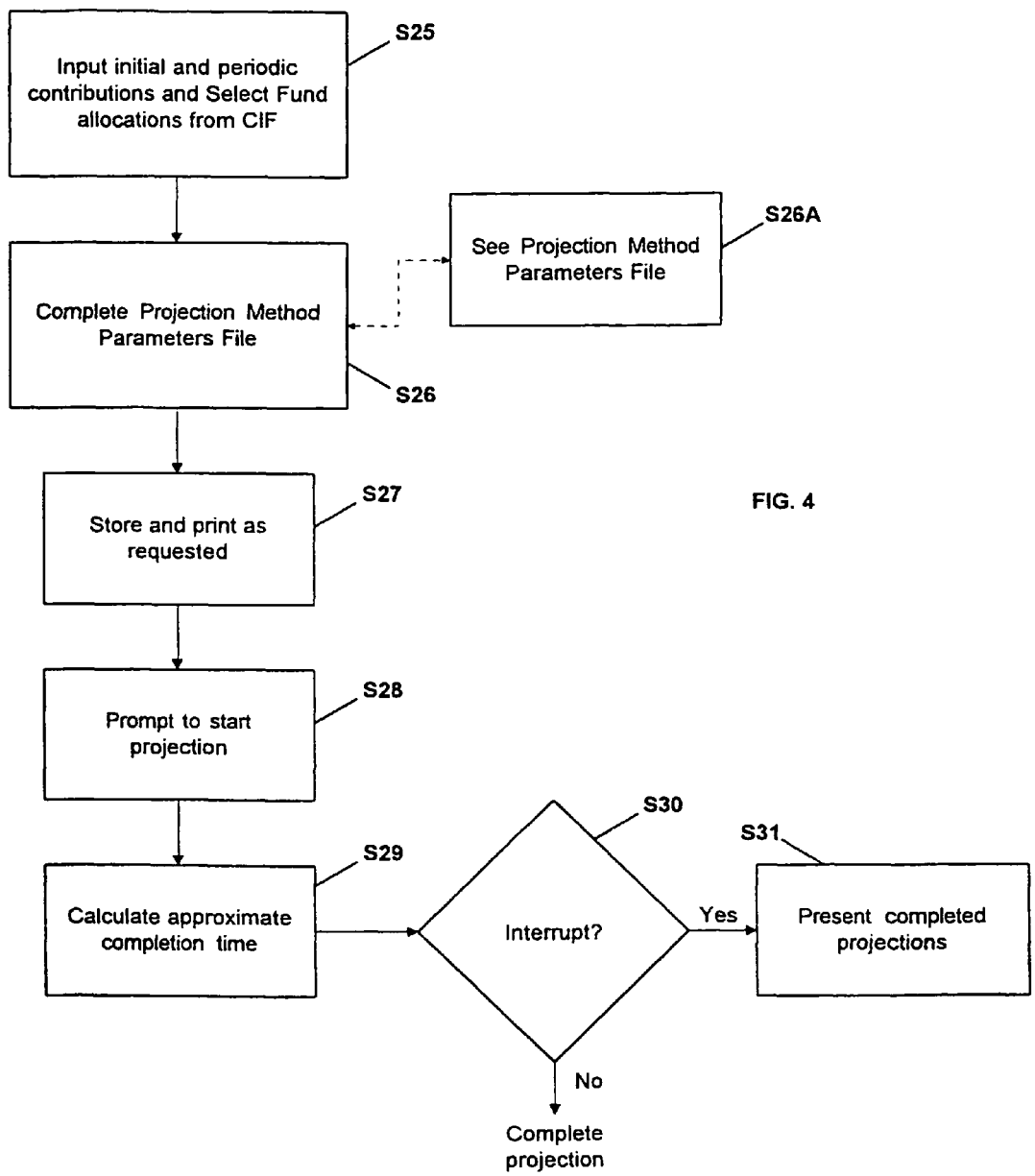
FIG. 4 presents a block diagram of a method for determining the projected accumulation amount using Select Funds for an embodiment of the present invention.

The method for determining the projected accumulation amount using Select Funds is presented in FIG. 4. In step S25, initial and periodic contributions and Select Fund allocations are inputted from the CIF. In step S26, a Projection Method Parameters File is completed; this information is identified from the Projection Method Parameters File list S26A. In step S27, the File information is stored and printed as requested. In step S28, the user is prompted to start the projection. In step S29, an approximate completion time is calculated and presented. In step S30, if the projection is interrupted, the completed projections are presented, as indicated in step S31. If the method is not interrupted in step S30, the projection continues to completion.

Various projection methods for embodiments of the present invention will now be described.

Projection Method 1 uses the average projected yield for each fund and projects forward using the specified contributions for each Select Fund as contained in the CIF. At the start of each month a deduction for the cost charged by the financial institution for the cost of covering any shortfall between the actual fund accumulation to the retirement date and the GAA is determined. For example, if the annual charge is 0.50% of assets, the actual monthly charge will be 0.0004157, or $(0+0.005)^{(1/12)}-1)$.

All of the projection methods include this annual accumulation of assets based on the contributions for each Select Fund as contained in the CIF, and a monthly deduction for the cost of providing the any extra funds needed to provide the GAA.

Figure 5A:
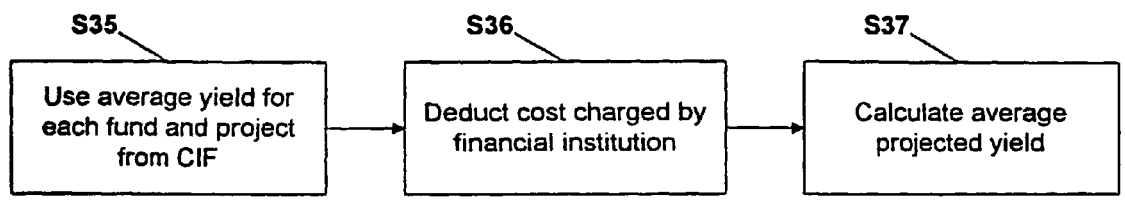

Projection Method 1 is presented in FIG. 5A. In step S35, the average yield for each fund and project from the CIF is accessed. In step S36, the cost charged by the financial institution is deducted. In step S37, the accessed information and cost data are used to calculate the average projected yield.

Projection Method 2 uses probable values based on the probability of Select Fund yields exceeding the projected yield for the Select Fund in any one year. In an embodiment of this projection method, using the projected random number starting point, the standard deviation and average yield for Select Funds, and the probability that the Select Fund yield will exceed the projected yield in any year, a Monte Carlo simulation is generated. The first year result is a projected yield in year one for the first Select Fund. Note that if the probability that the Select Fund yield will exceed the projected yield is 50%, the distribution of outcomes is a normal curve. If the probability is different (for example 40%), the normal distribution is shifted so that only 40% of the time, the random yield generated exceeds the projected yield.

This projected random number starting point is also used to enter a standard random number generating routine and produce the second random number that is then used to determine the second year normal distribution random number Select Fund yield. This process is continued for all years for each select fund. The Select Fund yields by year are then input in a Method 1 calculation of Average Projected Yield for Scenario 1. As a last step, the last random number is used to generate a new random number that will be the starting point for the Scenario 2 projection.

This process is completed for as many scenarios as specified in the Projection Method Parameters File. The outcomes for each scenario are cataloged and the mean and probable projected accumulation amounts based on 95%, 90%, ... 5% are displayed, and printed if requested.

FIG. 5B presents Projection Method 2. In step S40, scenario 1 starts. In step S41, a random number starting point is generated. In step S42, the following are inputted: 1) standard deviation; 2) average yield for the Selected Fund (SF); and 3) probability the Selected Fund Yield (SFY) will exceed the projected yield in any year. In step S43, the random number and inputs are used to generate a Monte Carlo simulation for the first year. In step S44, the random number starting point generated in step S41 is used to generate a second random number. In step S45, the second random number and the Monte Carlo simulation generated in step S43 are used to generate a Monte Carlo simulation for year 2. In step S46, the random number starting point generated in step S41 is used to generate a third random number. In step S47, the third random number and the Monte Carlo simulation generated in step S45 are used to generate a Monte Carlo simulation for year 3.

The procedure continues for the total number of years of the projection method. In step S48, a random number for the last year is generated using the random number starting point generated in step S41. In step S49, a Monte Carlo simulation for the last year is generated using the random number of step S48 and the Monte Carlo simulation for the previous year. The output of step S49 serves as the input for Projection Method 1 to produce an average projected yield for scenario 1.

In step S50, the last random number generated in step S48 is used to generate a random number for scenario 2, and the entire process continues until, as indicated in step S51, the outcomes for each scenario are calculated for the number of scenarios specified in the Projected Method Parameters File. In step S52, the mean and probable projected accumulation amounts are displayed and printed by scenario if requested.

Projection Method 3 uses probable values based on the probability that Select Funds will exceed the index for the fund in any year. For each index, the process uses a pre-loaded data file of average annual change in the index and a standard deviation for the change. A normal distribution random projection of annual index appreciation is made for each index specified by Select Funds. Also data is used from the Select Fund inventory, the standard deviation against benchmark index and past probability of exceeding index, and from the Projection Method Parameters File the probability that Select Funds will exceed the index for the fund in any year. With this data a second random normal distribution curve, shifted in a similar manner to Projection Method 2, is used to determine the Select Fund yield for the year applying a Monte Carlo simulation method as outlined in Projection Method 2.

Results are tabulated, displayed and printed upon request in the same fashion as Projection Method 2.

Figure 5C:
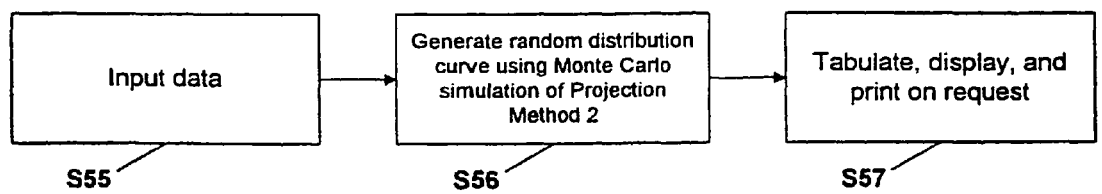

FIG. 5C presents Projection method 3. In step S55, data are inputted. In step S56, a random distribution curve using the Monte Carlo simulation of Projection Method 2 is generated. In step S57, results are tabulated and displayed, and printed on request.

In Projection Method 4 probable values based on the probability that Select Funds will exceed the index for the fund in any year, given that the index performance for the first three years are pre-set, is used. This method is Similar to Projection Method 3, except that the fund Index performance for the first three years are provided in the Projection Method Parameter File. This method allows the IC and client to project conservative appreciation for three years in selected indexes, such as the S&P 500, which have had above average appreciation in recent years.

For the first three years for each Select Fund, the yield is set equal to the index performance specified in the Projection Method Parameter File. For each succeeding projection year, the Projection Method 3 methodology is used.

Results are tabulated, displayed and printed upon request in the same fashion as Projection Method 2.

Figure 5D:
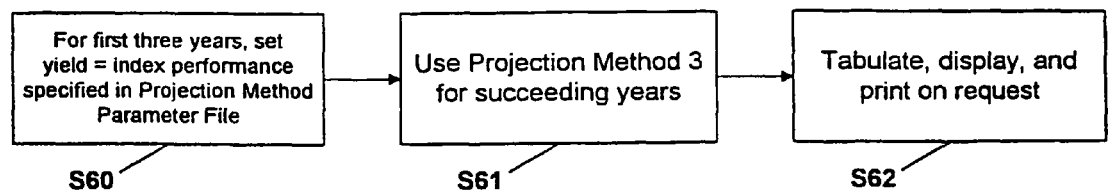

Projection Method 4 is presented in FIG. 5D. In step S60, for the first three years, the yield is set equal to index performance specified in the Projection Method Parameter File. In step S61, Projection Method 3 is used for succeeding years. In step S62, results are tabulated and displayed, and printed on request.

Projection Method 5 uses probable values based on Select Funds performing the same as the index for the fund in any year, less a set spread. This method is used for Select Funds that are index funds, in place of Methods 2, 3 or 4. For each index, the process uses a pre-loaded data file of average annual change in the index and a standard deviation for the change. A normal distribution random projection of annual index appreciation is made for the index specified by the Select Fund. A predetermined percentage of annual yield is then deducted from the projection of the index value. A Monte Carlo simulation method as outlined in Projection Method 2 is used to generate multiple projected Select Fund accumulation amounts. Results are tabulated, displayed and printed upon request in the same fashion as Projection Method 2.

Figure 5E:
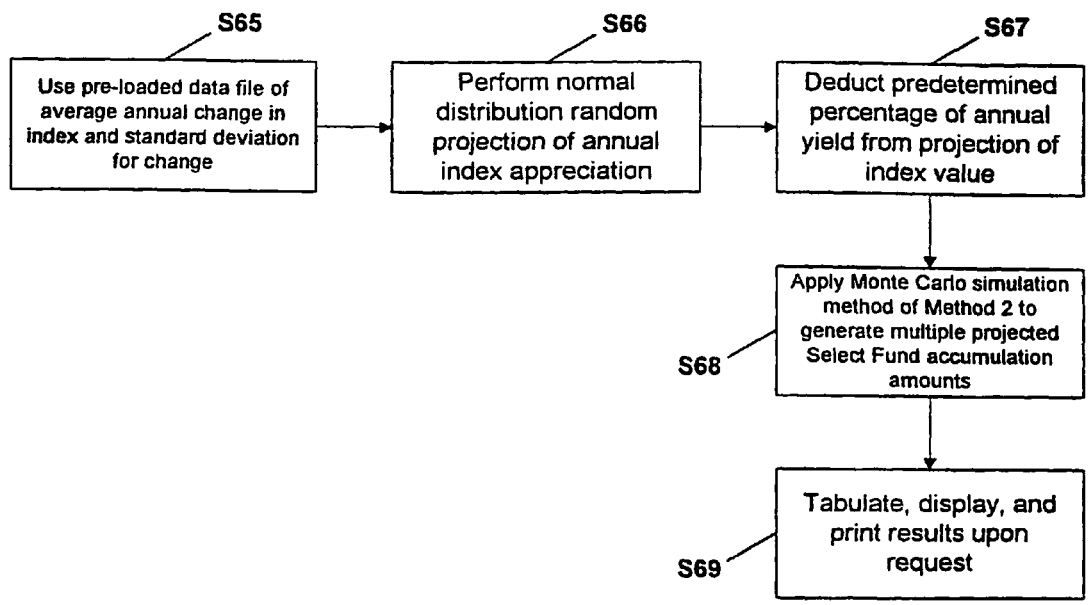

FIG. 5E presents Projection Method 5. In step S65, the pre-loaded data file of average annual change in index and standard deviation for change is accessed. In step S66, a normal distribution random projection of annual index appreciation is performed. In step S67, a predetermined percentage of annual yield is deducted from the projection of index value. In step S68, the Monte Carlo simulation method of Method 2 is applied to generate multiple projected Select Fund accumulation amounts. In step S69, the results are tabulated and displayed, and printed upon request.

Under all projection methods used for Select Funds, the calculated GAA is increased by the sales commission necessary to purchase a single premium immediate annuity, if the client requests retirement income options. Note that the client does have the right to take the GAA at retirement, if that amount is greater than the total account values of the mutual funds. But if the client decides to proceed with a guaranteed payout and if the sales commission is 3% (for example), the adjusted GAA is increased by dividing the figures by (1-3%).

The method for using a VA to fund the GAA for an embodiment of the present invention will now be described.

In an embodiment of the present invention, the IC and client review the list of VA separate account funds that are approved for use with this process. These will be designated at VA Select Funds. This process starts with using a detailed VA Select Fund inventory, which includes: 1) fund ID number; 2) fund name; 3) fund investment objective and code; 4) fund manager biography; 5) annual administrative fees; 6) projected annual return (net of admin. fees); 7) estimated standard deviation of return; 8) bench mark index; 9) past probability of exceeding index; 10) standard deviation against benchmark index; and 11) if the VA Fund is an asset allocation fund, list the percent allocation to this portion of the fund. Note that asset allocation funds need to be split into "sub funds" or separate VA Select Funds that are linked. Projections are handled separately, but the results are combined to the total asset allocation fund.

In an embodiment of the present invention, the process has guidelines concerning both fund diversification and investment objective diversification, which are contained in the VA Diversification Guideline File. The IC and client designate specific VA Select Funds for investment, within the diversification guidelines. For fund diversification, no more than x % (for example 30%) can be invested in any one fund. For investment objective diversification, at least y (for example, 3) different investment objectives should be selected, and any one objective should have no more than z % (for example, 50%) of projected investment.

The VA Diversification Guideline File includes the following information: 1) maximum % investment in any one fund (for example, 30%); 2) minimum number of fund objectives (for example, three); 3) maximum % investment in any fund objective (for example, 50%); and 4) maximum % investment limit for specific fund objectives (list fund objective, maximum total limit, maximum single fund limit) (for example, small cap growth, 20%, 20%; large cap value, 40%, 30%, international fund, 20%, 20%; etc.).

The IC and client then use an interactive process to determine a pattern of investments that results in achieving the required GAA previously determined. The client and IC complete the VA CIF. With information on the CIF the process then calculates a GAA figure and compares this calculated value with the required GAA.

The VA CIF includes the following information: 1) client number; 2) information included on client file for settlement option process file (name, address, primary and secondary annuitant risk classification, etc.); 3) start date of fund investment guarantee; 4) total initial contribution on start date; 5) total initial fund balance on start date; 6) guaranteed accumulation date (immediate annuity start date); 7) VA Select Fund allocation at start fate (list of fund name, investment objective, initial fund contribution, or initial fund balance); 8) periodic contribution start date; 9) total amount of periodic contribution; 10) mode of periodic contribution (monthly, quarterly, semi-annual or annual); 11) date of annual increase in contribution (if any); 12) specify increase as compound %, or flat $ amount; 13) xx %, if increase is compound %; 14) $yy amount of mode increase, if specified; 15) date of last contribution; and 16) VA Select Fund allocation for periodic payments (list of fund name, investment objective, initial fund contribution, or initial fund balance).

The process checks the VA CIF to make sure that diversification guidelines are followed. Exceptions are noted and the process stops until corrections are made. The process suggests alternative inputs to the VA CIF that will produce the required GAA. Suggested alternative inputs for VA include: 1) change in initial contribution; 2) change in amount of periodic contribution; 3) change in flat $ or compound % increase in contribution; 4) rr % (for example 50%) of the change in amount of periodic contribution specified in 2) above combined with ss change in flat $ or compound % increase in contribution.

When the client and the IC have agreed upon a VA CIF that will result in achieving the GAA, the VA CIF is printed and saved.

Figure 6:
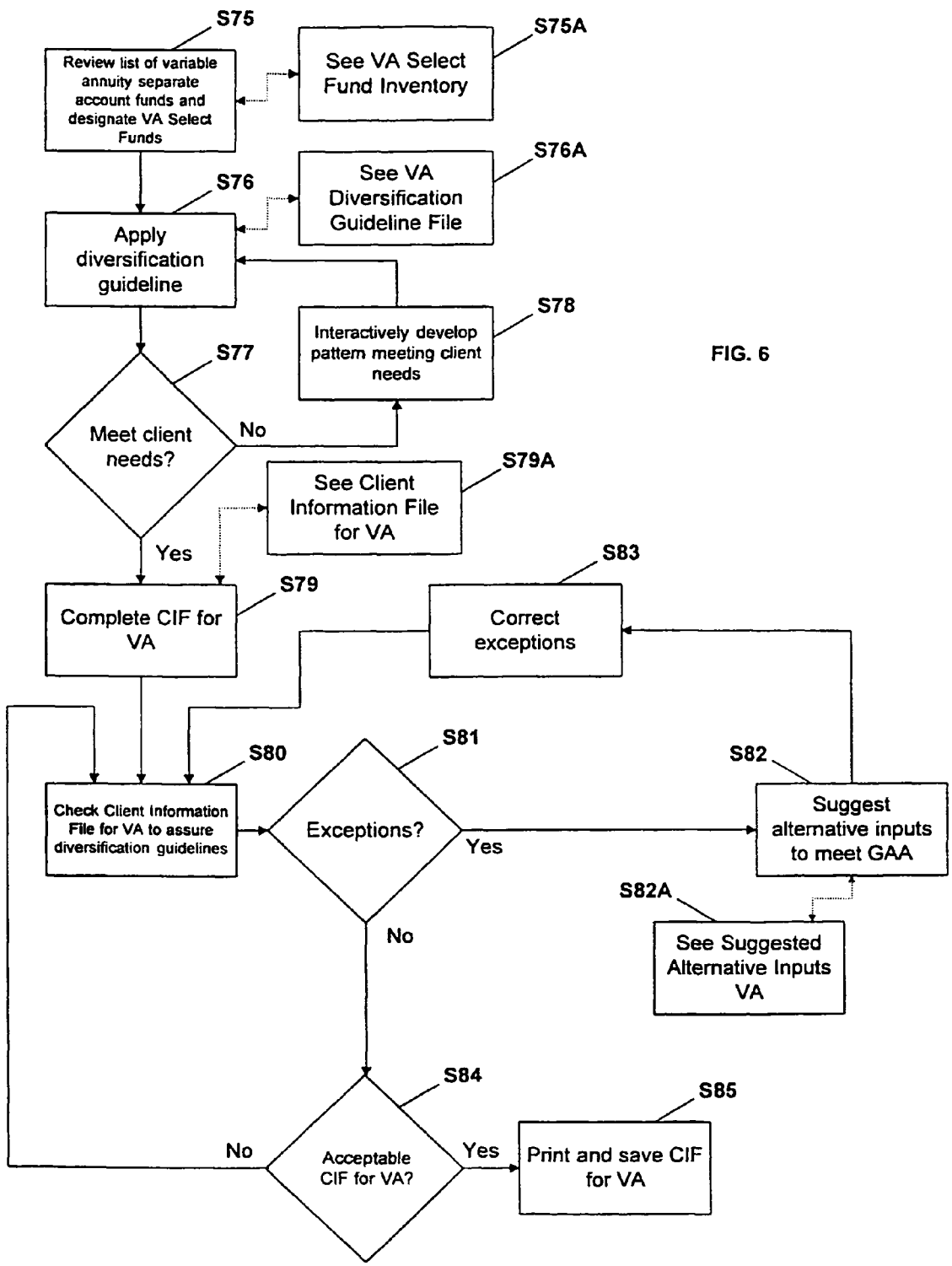
FIG. 6 is a block diagram of a method for using a variable annuity to fund the guaranteed accumulation amount for an embodiment of the present invention.

FIG. 6 presents the method for using a VA to fund the GAA. In step S75, the list of VA separate account funds is reviewed, and VA Select Funds are designated. The review is reviewed using the VA Select Fund inventory S75A. In step S76, the diversification guideline is applied using the VA Diversification Guideline File S76A. In Step S77, it is determined whether the VA Select Funds meet the client needs. If not, the method proceeds to step S78, in which a pattern of VA Select Funds meeting client needs is interactively developed, and the method returns to step S76.

In step S77, if the VA Select Funds meet the client needs, the method proceeds to step S79, in which a VA CIF is completed using the VA CIF S79A. In step S80, the VA CIF is checked to assure that diversification guidelines are met. In step S81, it is determined whether any exceptions result from the diversification guidelines check. In step S81, if exceptions are identified, the method proceeds to step S82, in which alternative inputs to meet the GAA are suggested. In step S83, the exceptions are corrected, and the method returns to step S80.

If no exceptions are identified in step S81, the method proceeds to step S84, in which it is determined whether the VA CIF is acceptable. If no, the method returns to step S80. In step S84, if the VA CIF is acceptable, the method proceeds to step S85, in which the VA CIF is printed and saved.

A method for suggesting VA Funds Producing a Maximum projected accumulation amount based on a given probability of success for an embodiment of the present invention will now be described.

In an embodiment of the present invention, projections for each VA Select Fund are made using single or level contribution patterns for projected accumulation periods from 10 to 70 years. For example, the accumulation pattern could be $10,000 single at issue of the guarantee or $1,000 each year. The projected accumulation value distribution function (using Projection Method 3, as indicted below) for each payment pattern and accumulation period are stored for each VA Select Fund. As a first step in helping a client, the IC specifies the accumulation period, single contribution or level annual contribution the client needs to make (based on the GAA). The IC and client also specify the probability of the projected accumulation value equaling or exceeding an undetermined amount. For example, the IC and client might specify that they want to solve for a projected accumulation value that has a 70% probability of being achieved.

The process searches the predetermined probability distributions for all potential VA Select Funds for the accumulation period and single or level contribution pattern specified. The VA Select Fund with the highest projected accumulation amount for the particular specified probability is listed, followed by the next highest, until the top 10 VA Select Funds are listed. The Process than uses the VA Select Fund Diversification File to recommend an optimum allocation of contributions to VA Select Funds and the projected accumulation amount for which the probability of achieving or exceeding the result is equal to the probability specified by the IC and client.

In an embodiment of the present invention, based on the results of this quick check of all potential Select Funds, the IC and client return to the VA CIF, input different VA Select Funds, and repeat the process described above with regard to the method for using a VA to fund the GAA.

Figure 7:
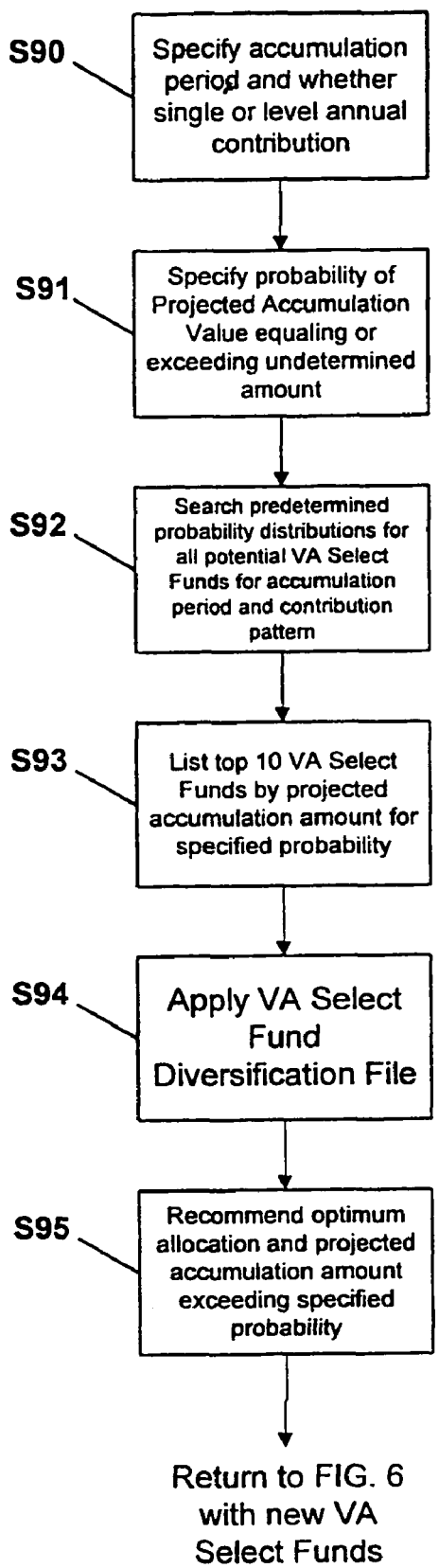
FIG. 7 contains a block diagram of a method for suggesting variable annuity funds producing a maximum projected accumulation amount based on a given probability of success for an embodiment of the present invention.

FIG. 7. presents a method for suggesting VA Funds producing a maximum projected accumulation amount based on a given probability of success for an embodiment of the present invention. In step S90, an accumulation period and whether single or level annual contributions are to be made are specified. In step S91, the probability of a projected accumulation value equaling or exceeding an undetermined amount is specified. In step S92, a search is made of predetermined probability distributions for all potential VA Select Funds for the accumulation period and contribution pattern.

In step S93, the to 10 VA Select Funds are listed by projected accumulation amount for the specified probability. In step S94, the VA Select Fund Diversification File is applied. In step S95 an optimum allocation and projected accumulation amount exceeding the specified probability are recommended. In an embodiment of the present invention, the method then returns to the method of FIG. 6 with new VA Select Funds.

A method for determining the projected accumulation amount using a VA for an embodiment of the present invention will now be described.

Using the initial and periodic contributions and VA Select Fund allocations contained in the VA CIF, the process determines a projected accumulation amount using up to four methods. The IC and client analyze the results and use the projected accumulation amount from the projection method they select. In an embodiment of the present invention, the IC and client first complete VA Projection Method Parameters File. The VA Projection Method Parameters File includes the following information: 1) probability that VA Select Funds will exceed index for the fund in any year (for each VA Select Fund list the index, 5 year history of the fund versus the index, and input the probability that the VA Select Fund will exceed the index); 2) for indexes used (list the performance over the past five years, input estimated performance over the next three years); 3) probability that VA Select Funds will exceed projected yield in any year (for each VA Select Fund list the average fund yield, actual yield over the past five years, and input probability the fund will exceed the average fund yield in the future); 4) projection random number starting point (number between 1 and 99,999); and 5) number of scenario tests per projection (between 100 and 10,000)

In an embodiment of the present invention, when the IC and client have completed the VA Projection Method Parameters File, the information is stored, and printed, if requested. The IC and client are then prompted to start the projection. Based on the number of VA Select Funds, years to retirement date, number of scenario tests per projection, and the speed of the computer processor unit, an approximate time for completing the projections is given as the first step in the projection. The IC and client can stop the projection at any time. If the process is interrupted, the answers to the projections that have been completed are displayed.

Figure 8:
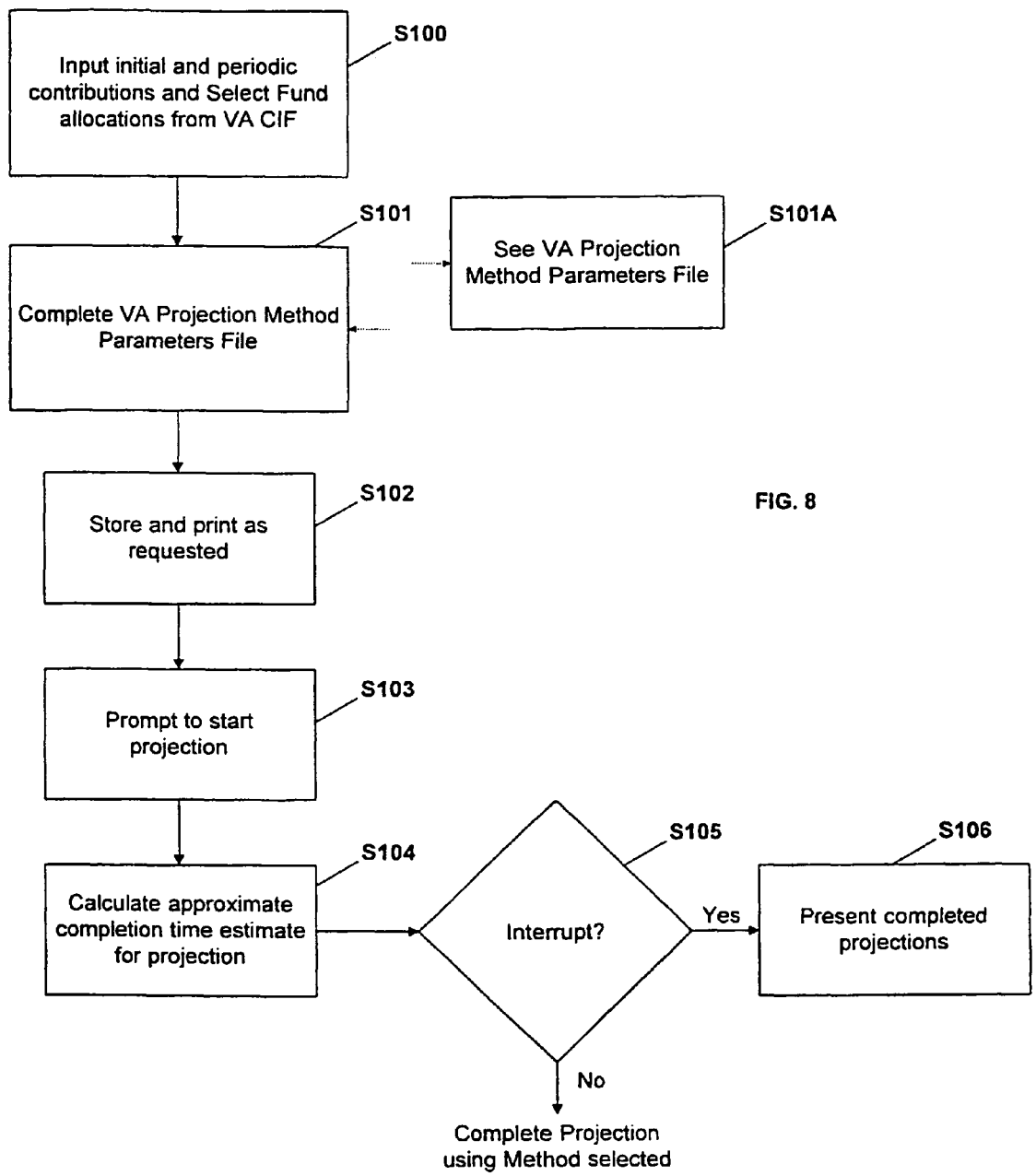
FIG. 8 presents a method for determining the projected accumulation amount using a variable annuity for an embodiment of the present invention.

FIG. 8 presents a method for determining the projected accumulation amount using a VA for an embodiment of the present invention. In step S100, the initial and periodic contributions and Select Fund allocations from the VA CIF are inputted. In step S101, the VA Projection Method Parameters file is completed based on the VA Projection Method Parameters File information requirements S101A. In step S102, this information is stored and printed as requested.

In step S103, the user is prompted to start the projection. In step S104, an approximate completion time estimate for the projection is calculated. In step S105, if the user interrupts, the method proceeds to step S106, in which the completed projections are presented. If no interrupt occurs in step S105, the method proceeds to complete the projection using the method selected.

Embodiments of the various VA projection methods will now be presented.

VA Projection Method 1 uses the average projected yield. This method is the same as Projection Method 1, described above, but the VA Select Fund is used in place of the Select Fund and the VA CIF is used in place of the CIF.

All of the projection methods include this annual accumulation of assets based on the contributions for each VA Select Fund as contained in the VA CIF, and a monthly deduction for the cost of providing the any extra funds needed to provide the GAA.

Figure 9A:
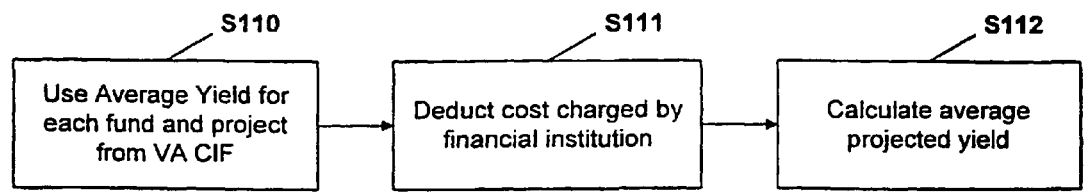

FIG. 9A presents VA Projection Method 1. In step S110, the average yield for each fund and project from the VA CIF is accessed. In step S111, the cost charged by the financial institution is deducted. In step S37, the accessed information and cost data are used to calculate the average projected yield.

VA Projection Method 2 uses probable values based on the probability of VA Select Fund yields exceeding the projected yield for the VA Select Fund in any one year. This method is the same as Projection Method 2, described above, but the VA Select Fund is used in place of the Select Fund and the VA CIF is used in place of the CF.

FIG. 9B presents VA Projection Method 2. In step S115, scenario 1 starts. In step S116, a random number starting point is generated. In step S117, the following are inputted: 1) standard deviation; 2) average yield for the Selected Fund (SF); and 3) probability the Selected Fund Yield (SFY) will exceed the projected yield in any year. In step S118, the random number and inputs are used to generate a Monte Carlo simulation for the first year. In step S119, the random number starting point generated in step S116 is used to generate a second random number. In step S120, the second random number and the Monte Carlo simulation generated in step S118 are used to generate a Monte Carlo simulation for year 2. In step S121, the random number starting point generated in step S116 is used to generate a third random number. In step S122, the third random number and the Monte Carlo simulation generated in step S120 are used to generate a Monte Carlo simulation for year 3.

The procedure continues for the total number of years of the VA projection method. In step S123, a random number for the last year is generated using the random number starting point generated in step S116. In step S124, a Monte Carlo simulation for the last year is generated using the random number of step S123 and the Monte Carlo simulation for the previous year. The output of step S123 serves as the input for VA Projection Method 1 to produce an average projected yield for scenario 1.

In step S125, the last random number generated in step S123 is used to generate a random number for scenario 2, and the entire process continues until, as indicated in step S126, the outcomes for each scenario are calculated for the number of scenarios specified in the Projected Method Parameters File. In step S127, the mean and probable projected accumulation amounts are displayed and printed by scenario if requested.

Projection Method 3 uses probable values based on probability that VA Select Funds will exceed the index for the fund in any year. This method is the same as Projection Method 3, described above, but the VA Select Fund is used in place of the Select Fund and the VA CIF is used in place of the CIF.

Figure 9C:
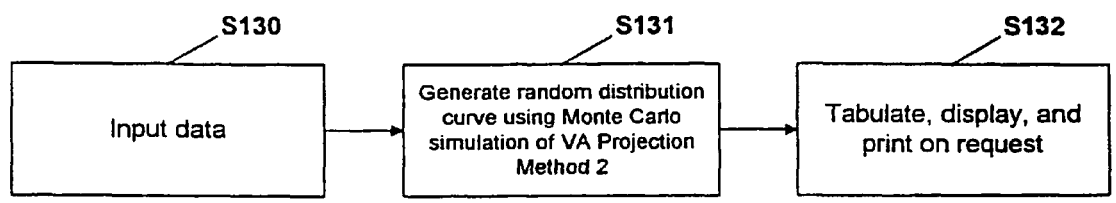

FIG. 9C presents VA Projection method 3. In step S130, data are inputted. In step S131, a random distribution curve using the Monte Carlo simulation of VA Projection Method 2 is generated. In step S132, results are tabulated and displayed, and printed on request.

Projection Method 4 uses probable values based on the probability that VA Select Funds will exceed the index for the fund in any year, given that the index performance for the first three years are pre-set. This method is the same as Projection Method 3, described above, but the VA Select Fund is used in place of the Select Fund and the VA CIF is used in place of the CIF.

Figure 9D:
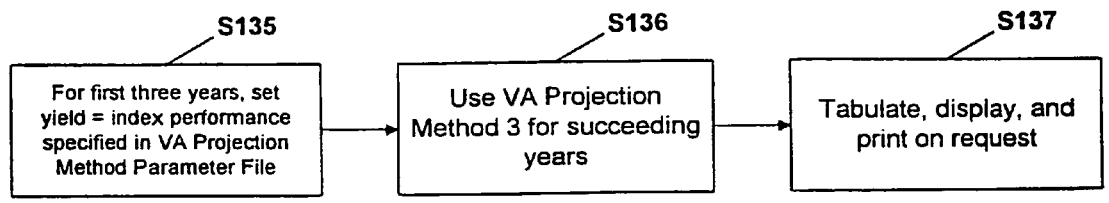

VA Projection Method 4 is presented in FIG. 9D. In step S135, for the first three years, the yield is set equal to index performance specified in the VA Projection Method Parameter File. In step S136, Projection Method 3 is used for succeeding years. In step S137, results are tabulated and displayed, and printed on request.

Projection Method 5 uses probable values based on Select Funds performing the same as the index for the fund in any year, less a set spread. This method is used for VA Select Funds that are index funds, in place of Methods 2, 3 or 4. This method is the same as Projection Method 5, described above, but the VA Select Fund is used in place of the Select Fund and the VA CIF is used in place of the CIF.

Under all projection methods used for VA Select Funds, the calculated GAA is used to purchase a retirement income option. Note that the client does not have the right to take the GAA at retirement if that amount is greater than the total account values of the VA separate accounts. Also note that the guaranteed and projected accumulation amounts do not need to be increased to cover a mutual fund sales commission, because these amounts have already been covered by VA deductions made during the accumulation period.

Figure 9E:
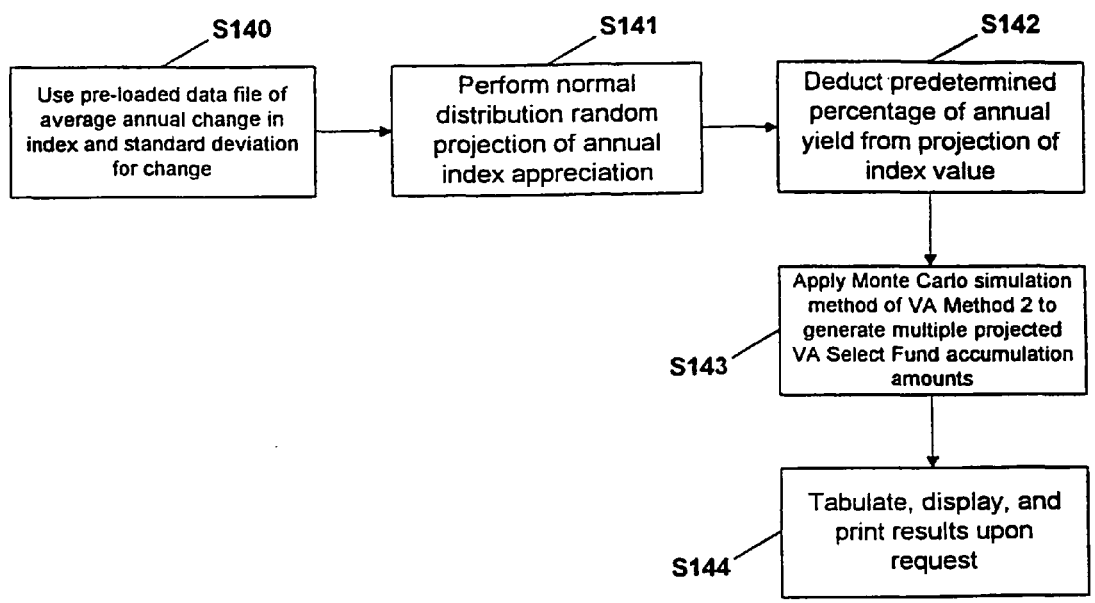

FIG. 9E presents VA Projection Method 5. In step S140, the pre-loaded data file of average annual change in index and standard deviation for change is accessed. In step S141, a normal distribution random projection of annual index appreciation is performed. In step S142, a predetermined percentage of annual yield is deducted from the projection of index value. In step S143, the Monte Carlo simulation method of Method 2 is applied to generate multiple projected VA Select Fund accumulation amounts. In step S144, the results are tabulated and displayed, and printed upon request.

A method for determining a current projected fixed retirement income amount for an embodiment of the present invention will now be presented.

With the Flexible Annuity Settlement Proposal Generating System (patent application Ser. No. 08/525,037), in an embodiment of the present invention, the projected accumulation amounts (at various probability distribution points) are used to determine a current projected fixed retirement income amount. The Flexible Annuity Settlement Proposal Generating System contains an Investment Yield Information Table and a Pricing Parameters Table (page 11 of patent application Ser. No. 08/525,037). The issue commission is set at 0% in the Pricing Parameters Table and the best estimate for treasury security yields and additional basis point spreads (as of the guaranteed accumulation date) are given as input. If a range of treasury yields and spreads are estimated for this future date, multiple projected fixed retirement income amounts are calculable for each probability distribution point. To minimize the number of values in an embodiment of the present invention, a low, midpoint, and high estimate of treasury yields and spreads are used.

Figure 10:
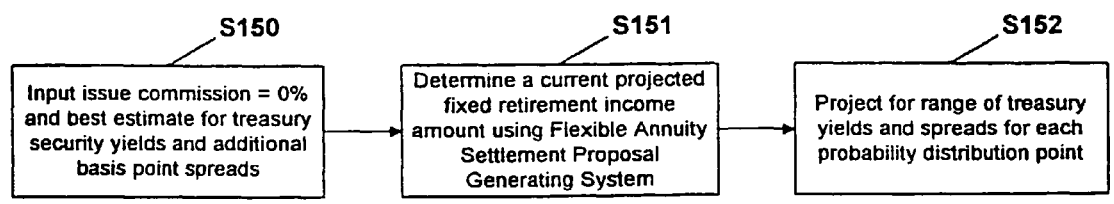
FIG. 10 is a method for determining a current projected fixed retirement income amount for an embodiment of the present invention.

FIG. 10 contains a method for determining a current projected fixed retirement income amount for an embodiment of the present invention. In step S150, the issue commission is set equal to 0% and inputs are made for the best estimate for treasury security yields and additional basis point spreads. In step S151, a current projected fixed retirement income amount is determined using the Flexible Annuity Settlement Proposal Generating System. In step S152, a projection is completed for a range of treasury yields and spreads for each probability distribution point.

A method for determining a guaranteed cumulative VA retirement income amount for an embodiment of the present invention will now be presented.

The client might decide to use a VA benefit option, but still wish to have a minimum floor of protection. The financial institution guarantees this benefit floor for particular retirement income options that contain certain payout periods of 10 years or longer (for example, single life annuity with 10 years certain). The charge for this benefit is higher than the combined VA guaranteed accumulation and guaranteed fixed retirement income amount because the guarantee period is much shorter and the retirement income is a VA option using VA Select Funds as the investment vehicle. In an embodiment of the present invention, the charge ranges from 1.0% to 1.5% of VA account value (deducted from the NAV on a daily basis), in addition to the normal charges for administration and mortality and expense guarantees. The pricing for this benefit is discussed further below with regard to the method for pricing a guaranteed cumulative VA retirement income amount.

If the client selects this benefit, the annuity purchase rate is determined using the Flexible Annuity Settlement Proposal Generating System (patent application Ser. No. 08/525,037), with all pricing parameters table data set at 0% or $0, the treasury yields for all durations set at 5% and the additional basis points set at 0%. This produces a benefit based on 5% (this process works at other interest rates, but 5% is used here as a basic example). Standard VA annuitization accounting using a 5% assumed interest rate is then used to develop all of the actual monthly benefits.

At the end of the guaranteed payout period (10 years or more) and each year thereafter, the total actual benefit payments made are compared with the total benefits that would have been payable using the annuity benefit amount based on the 5% interest factor. If the actual benefit payments are less than the 5% guaranteed benefit totals, the difference is paid to the annuitant(s) at the end of the contract year, and added to the total benefit paid amount. This process continues for the duration of the retirement income benefit.

Figure 11:
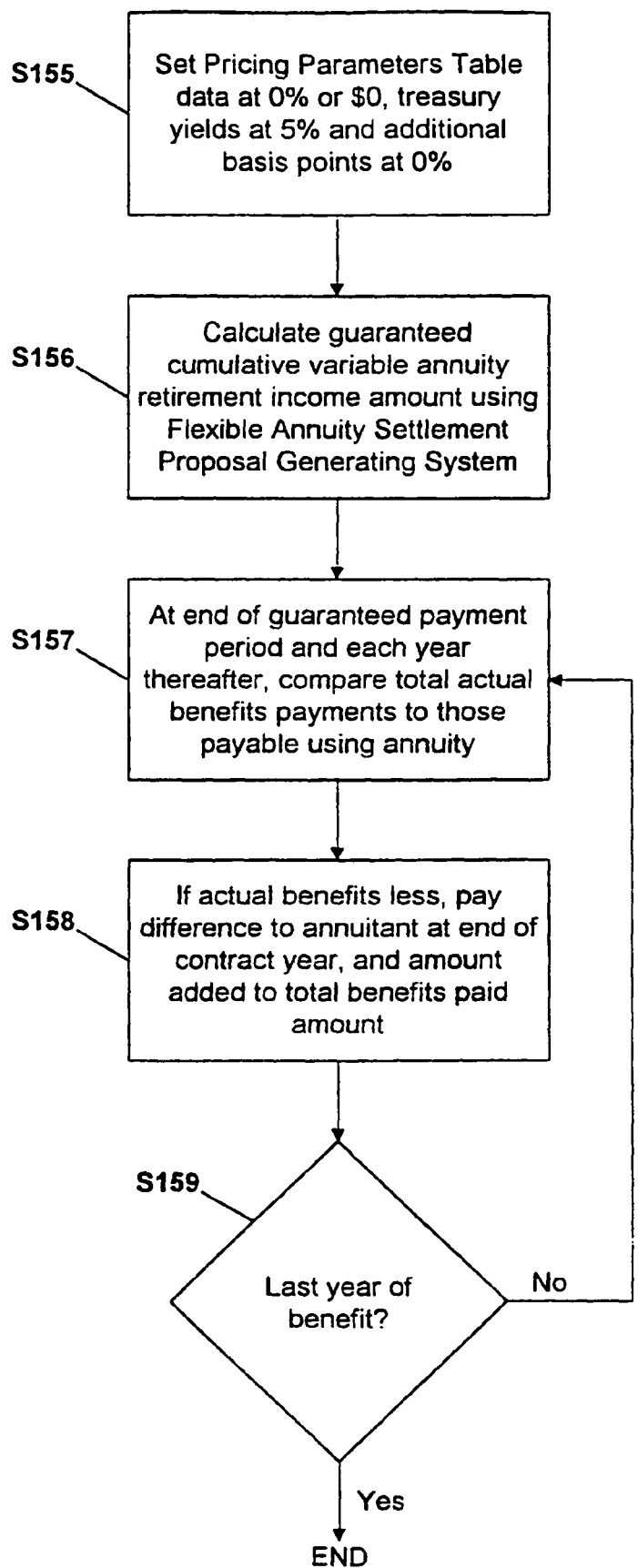
FIG. 11 contains a method for determining a guaranteed cumulative variable annuity retirement income amount for an embodiment of the present invention.

FIG. 11 presents a method for determining a guaranteed cumulative VA retirement income amount for an embodiment of the present invention. In step S155, Pricing Parameters Table data are set at 0% or $0, treasury yields are set at 5%, and additional basis points are set at 0%. In step S156, the guaranteed cumulative variable annuity retirement income amount is calculated using the Flexibility Annuity Settlement Proposal Generating System. In step S157, at the end of the guaranteed payment period each year thereafter, the total actual benefits payments are compared to those payable using an annuity. In step S158, if the actual benefits are less, the difference is paid to the annuitant at the end of the contract year, and the amount is added to the total benefits paid amount. In step S159, it is determined whether it is the last year of the benefit. If no, the method returns to step S157. If yes, the method ends.

A method for pricing mutual fund charges for funding the GAA for an embodiment of the present invention will now be presented.

The first step in pricing involves developing a large model office of potential CIFs with extensive variation of duration of benefit, contribution patterns and Select Fund choices. A range of monthly charges for the guaranteed benefit is tested for each model office CIF. Each test consists of projecting a projected accumulation amount using Projection Methods 2, 3 and 4, described above, with one overall Projection Method Parameter File. The monthly charge for the guarantee is deducted and accumulated (using current net investment rates for the proper duration), to each Guaranteed Accumulation Date, and the 5% GAA as of that date is also determined.

For each calculated projected accumulation amount, the accumulated monthly charge is added and the GAA is subtracted. The resulting probability distribution provides a range of net values. At the probability and distribution selected (for example, Projection Method 4 and 90% probability), the guarantee charge that produces a $0 value is selected.

In an embodiment of the present invention, this pricing method is used to test the parameters used in the Diversification Guideline File discussed above with regard to a method for accumulating an investment fund equal to the GAA using Select Funds. Alternate guidelines are also testable, with the one that produces the lowest guarantee charge becoming the optimum diversification guideline.

Figure 12:
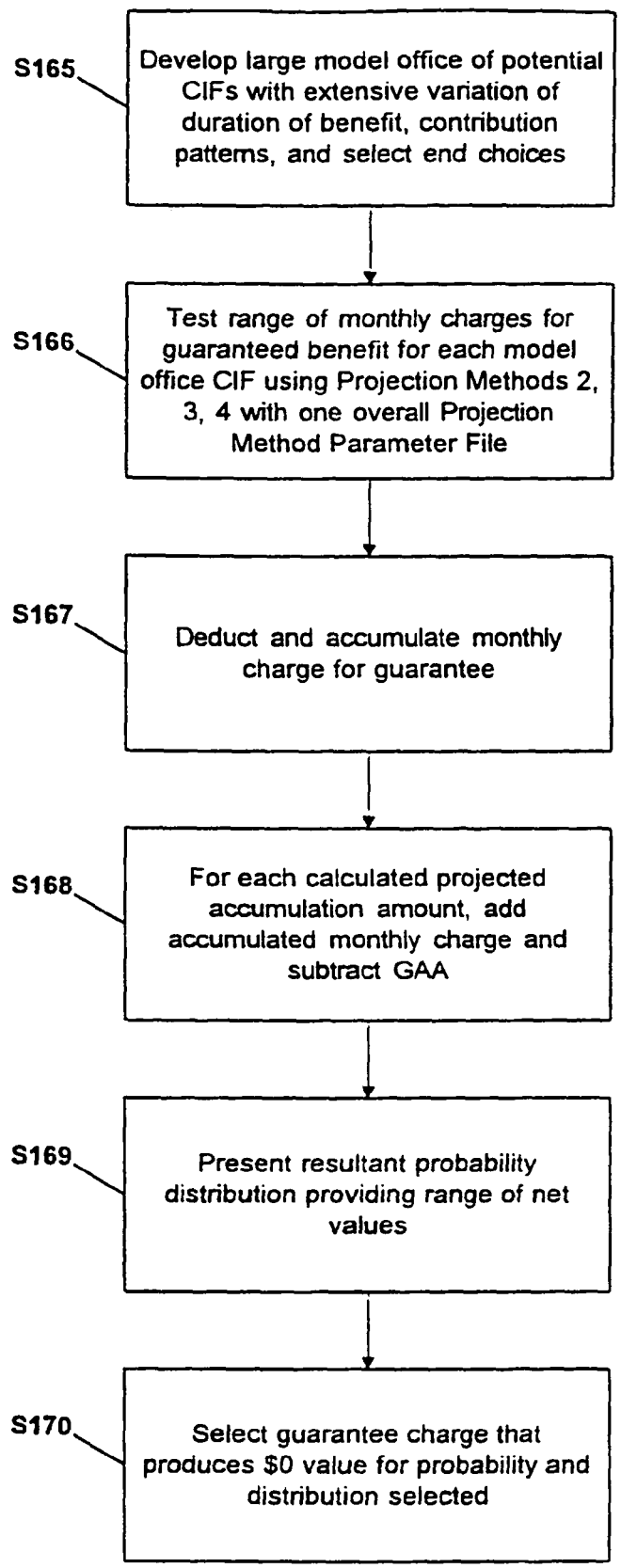
FIG. 12 presents a method for pricing mutual fund charges for funding the guaranteed accumulation amount for an embodiment of the present invention.

FIG. 12 presents a method for pricing mutual fund charges for funding the GAA for an embodiment of the present invention. In step S165, a large model office of potential CIFs with extensive variation of duration of benefit, contribution patterns, and select end choices is developed. In step S166, a range of monthly charges for the guaranteed benefit is tested for each model office CIF using Projection Methods 2, 3, and 4 with one overall Projection Method Parameter File. In step S167, the monthly charge for the guarantee is deducted and accumulated. In step S168, for each calculated projected accumulation amount, an accumulated monthly charge is added and a GAA is subtracted. In step S169, the resultant probability distribution providing a range of net values is presented. In step S170, the guarantee charge is selected that produces $0 value for the probability and distribution selected.

A method for pricing a VA charge for funding a GAA with a fixed retirement income guaranteed amount for an embodiment of the present invention will now be presented.

Pricing for this charge follows the same process as outlined above with regard to the method for pricing mutual fund charges for funding the GAA, with the following modifications. The VA CIF is used. At retirement the cost of the Fixed Retirement Income Guarantee using a range (low, mid-point and high) of assumptions in the Flexible Annuity Settlement Proposal Generating System (patent application Ser. No. 08/525,037), is determined. This value plus the accumulated cost of the guarantee charge is deducted from each projected accumulation value. This will result in multiple probability distributions. At the probability and distribution selected (for example, using Projection Method 3, mid-point of assumptions for annuity settlement option and 90% probability) the guarantee charge that produces a $0 value would be selected.

This pricing method could also be used to test the parameters used in the VA Diversification Guideline File discussed above. Alternate guidelines could be tested with the one that produces the lowest guarantee charge becoming the optimum diversification guideline.

Figure 13:
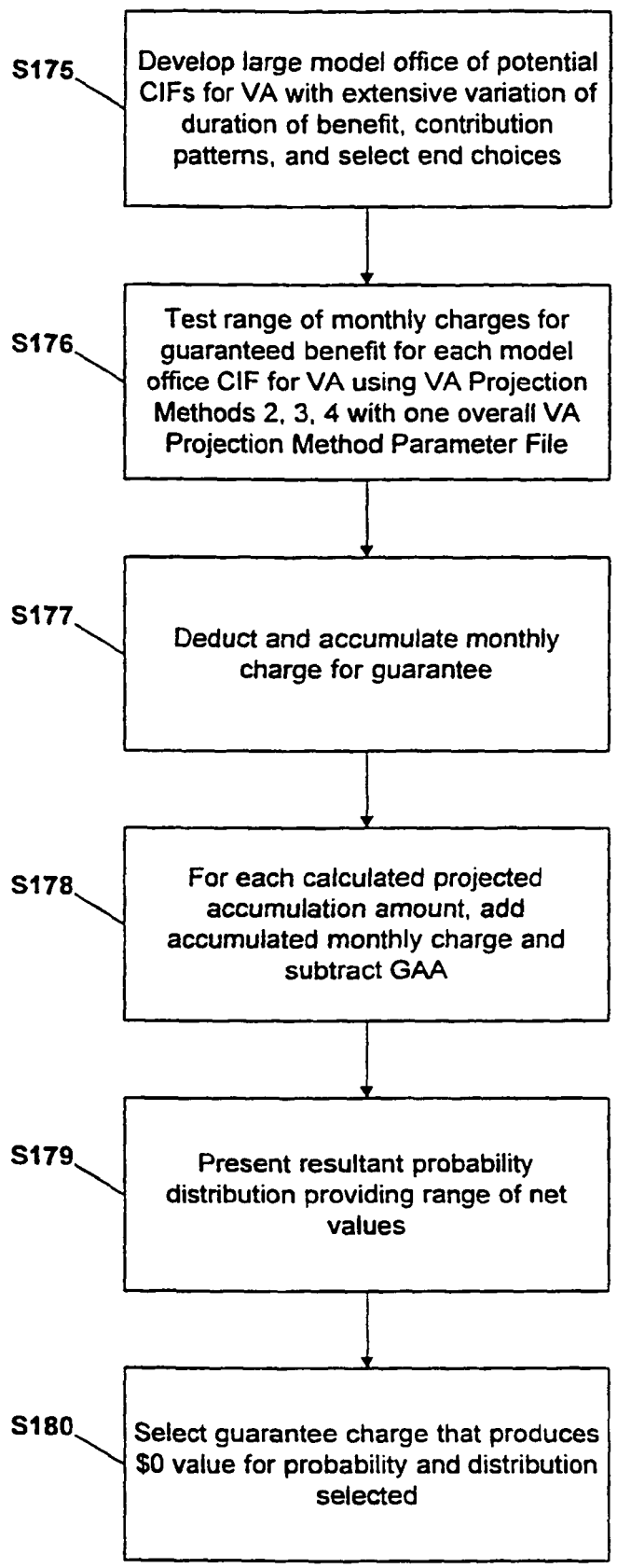
FIG. 13 shows a method for pricing a variable annuity charge for funding a guaranteed accumulation amount with a fixed retirement income guaranteed amount for an embodiment of the present invention.

FIG. 13 presents a method for pricing a VA charge for funding a GAA with a fixed retirement income guaranteed amount for an embodiment of the present invention. In step S175, a large model office of potential CIF's for VA with extensive variation of duration of benefit, contribution patterns, and select end choices is developed. In step S176, a range of monthly charges for the guaranteed benefit is tested for each model office VA CIF using Projection Methods 2, 3, and 4 with one overall VA Projection Method Parameter File. In step S177, the monthly charge for the guarantee is deducted and accumulated. In step S178, for each calculated projected accumulation amount, an accumulated monthly charge is added and a GAA is subtracted. In step S179, the resultant probability distribution providing a range of net values is presented. In step S180, the guarantee charge is selected that produces $0 value for the probability and distribution selected.

A method for pricing a guaranteed cumulative VA retirement income amount for an embodiment of the present invention will now be presented.

Pricing for this charge follows the same process as outlined with regard to the method for pricing mutual fund charges for funding the GAA, with the following modifications. The VA CIF is used. The projections start at the guarantee accumulation date and a single life with 10 year certain settlement option for ranges of risk classification is used. For each scenario any additional guarantee benefit payments are discounted back to the guaranteed accumulation date a the current net investment interest rate. The guarantee charge (which is deducted on a daily basis for the VA Select Funds) is also discounted back to the guaranteed accumulation date at the current net investment interest rate. At the probability and distribution selected (for example, using Projection Method 2 and 90% probability) the guarantee charge that produces a $0 value would be selected.

Figure 14:
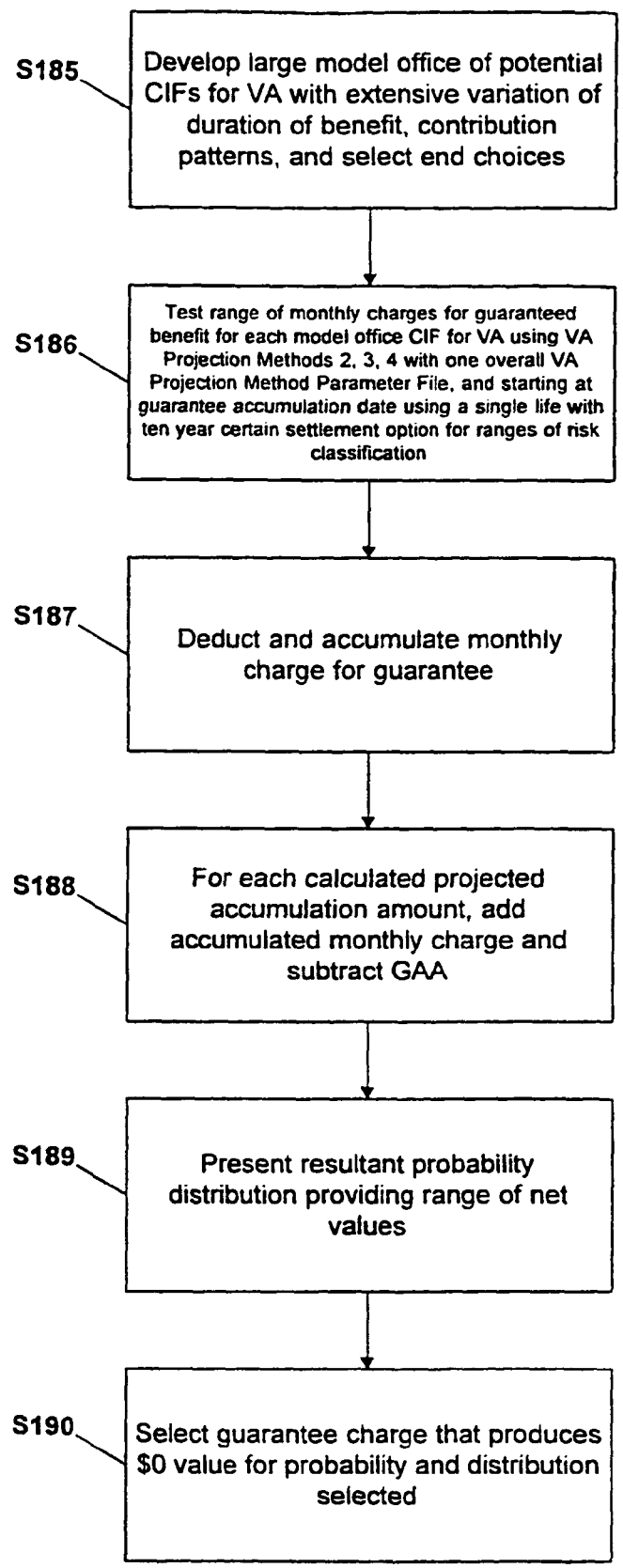
FIG. 14 is a method for pricing a guaranteed cumulative variable annuity retirement amount for an embodiment of the present invention.

FIG. 14 presents a method for pricing a guaranteed cumulative VA retirement income amount for an embodiment of the present invention. In step S185, a large model office of potential CIFs for VA with extensive variation of duration of benefit, contribution patterns, and select end choices is developed. In step S186, a range of monthly charges for the guaranteed benefit is tested for each model office VA CIF using Projection Methods 2, 3, and 4 with one overall VA Projection Method Parameter File and starting with a guaranteed accumulation date using a single life with a ten year certain settlement option for ranges of risk classification. In step S187, the monthly charge for the guarantee is deducted and accumulated. In step S188, for each calculated projected accumulation amount, an accumulated monthly charge is added and a GAA is subtracted. In step S189, the resultant probability distribution providing a range of net values is presented. In step S190, the guarantee charge is selected that produces $0 value for the probability and distribution selected.

A method for proposing, issuing, and processing the mutual fund accumulation guarantee for an embodiment of the present invention will now be presented.

Each of three methods described above (method for accumulating an investment fund equal to the GAA using Select Funds (see FIG. 2); method for suggesting Select Funds producing a maximum projected accumulation amount based on a given probability of success (see FIG. 3); method for determining the projected accumulation amount using Select Funds (see FIG. 4)) deal with proposing the mutual fund guarantee and projecting a probable outcome of distribution of projected accumulation amounts.

The Select Funds picked by the client and IC as contained in the CIF are used to generate a financial institution mutual fund guarantee statement, which includes the following data: 1) scheduled contribution pattern; 2) Select Funds and amounts of initial contribution; 3) Select Funds and % allocation of renewal contribution; 4) charge for guarantee; 5) GAA; 6) start and end date of accumulation; 7) legal contractual language of guarantee; and 8) signature blocks for client and IC.

This document is printed twice, and each copy is signed by the client and the IC. One copy is given to the client and the IC forwards one copy to the processing center. The initial contribution is collected and EFT is established for any renewal contribution. The information is also electronically transferred to the processing center. A probability distribution of projected accumulation amounts is also produced, given that they are distributed in the same fashion as the GAA.

If the client elects to also produce guaranteed and projected VA retirement income amounts the process, links are made to the appropriate parts of methods described below (method of proposing, issuing, and processing the VA GAA with a fixed retirement income guaranteed amount; method of proposing, issuing, and processing the guaranteed cumulative VA retirement income amount).

The mutual fund Guarantee Statement, as well as the CIF are electronically and permanently stored at processing center. The Select Fund administrators are notified of the guarantee. For each Select Fund on the first business day of each month, the fund administrator deducts the charge for the guarantee from the fund account balance. If the charge is 0.50% annually, the monthly charge is 0.000415715 [or $(1+0.0050)^{(1/12)}-1$] times the fund balance at the end of the first business day. This charge is printed on the mutual fund statement as "Charge for Minimum Guaranteed Accumulation." The fund administrator also generates an electronic fund report for the particular client and transmits the report to the processing center.

The client select fund report contains the following information: 1) client ID number; 2) client name; 3) fund ID number; 4) fund name; 5) date of report; 6) end of day fund balance prior to deduction for guarantee; 7) dollar amount of guarantee charge; 8) list of all deposits in prior month (including first day of month, loads on deposits, $ amount, date); 9) list of all withdrawals in prior month (including first day of month, loads on deposits, $ amount, date; excluding withdrawal for guarantee); and 10) if fund added to the client Select Fund list in prior month, the Account Value on the date added.

The total guaranteed charges for all clients that selected a particular fund is wired to the account of the processing center on the second business day of the month.

If a fund is removed from the select list, on the date the fund is removed, the account value of the client's fund is provided. This is treated as a withdrawal in determining the guaranteed accumulation value. On the guaranteed accumulation date (immediate annuity start date), the ending account value for each Select Fund is transmitted to the processing center upon request.

The processing center keeps a master file of all client transactions. The various electronic fund reports described above are combined for each client. As part of this tabulation the process determines that all Select Funds specified by the client have reported. If a fund has been terminated or if a client has transferred the account value from one fund to another, this net transaction is matched.

Any switch of Select Funds are checked to insure that the fund diversification guidelines are still met. If the diversification rules have been broken, the client is given a set number of days to reallocate funds. Otherwise, the process automatically generates withdrawal and deposit instructions for the Select Funds using rules previously communicated to the client. If total contributions exceed the amount listed in the mutual fund guarantee statement, the process triggers a report to the client asking that the excess contribution be withdrawn. If the excess amount is not withdrawn within a predetermined number of days and the total cumulative excess is greater than a predetermined amount (for example $1,000), the excess amount is withdrawn from the largest Select Fund and used to open a non-guaranteed account with the same fund for the client.

After the first business day of the month, the process determines a current guaranteed accumulation value as of the end of the prior month and compares that value to the total account values of all Select Funds. This information is electronically transferred to the client's selected financial institution statement (checking or savings account). This information is also passed to the reserve file, as discussed below with regard to the method of establishing and maintaining reserves for the mutual fund and VA accumulation and cumulative VA retirement income amounts.

At the end of the calendar year (and upon request from the client) a total summary of all contributions and withdrawals from all Select Funds, the total fund values and the GAA are printed and mailed the client.

In calculating the GAA, all considerations are accumulated on a daily interest basis at a 5% (for example) effective annual rate. For non-leap years the daily compound factor is 1.0001337 [or $(1.05)^{(1/365)}$]. For leap years the factor is 1.0001333 [or $(1.05)^{(1/366)}$]. Contributions are net of any sales loads. The monthly withdrawals to cover the cost of the guaranteed accumulation are not counted in the calculation. Other withdrawals (including withdrawal charges) are counted. Withdrawals are matched with contributions within the past 12 months and for purposes of this calculation the withdrawal is calculated from the date of the matched contribution. If any withdrawal amount is not matched with a contribution it is given a date 12 months prior to the actual withdrawal. For example, if a withdrawal of $2,000 is made on Mar. 17, 1997, and during the prior 12 months one contribution for $1,000 was made on Oct. 12, 1996, $1,000 of the withdrawal is dated Oct. 12, 1996 and the remaining $1,000 is dated Mar. 17, 1996.

Sixty days prior to the guaranteed accumulation date (immediate annuity start date) the client is sent a written notice of the coming event. The client is given the option of selecting new guarantee period based on the rules and charges then in effect, ending the benefit and receiving the excess of the GAA over the total Select Fund account values (if any), or taking this greater value (less any VA commission) and purchasing a VA retirement income amount.

Figure 15:
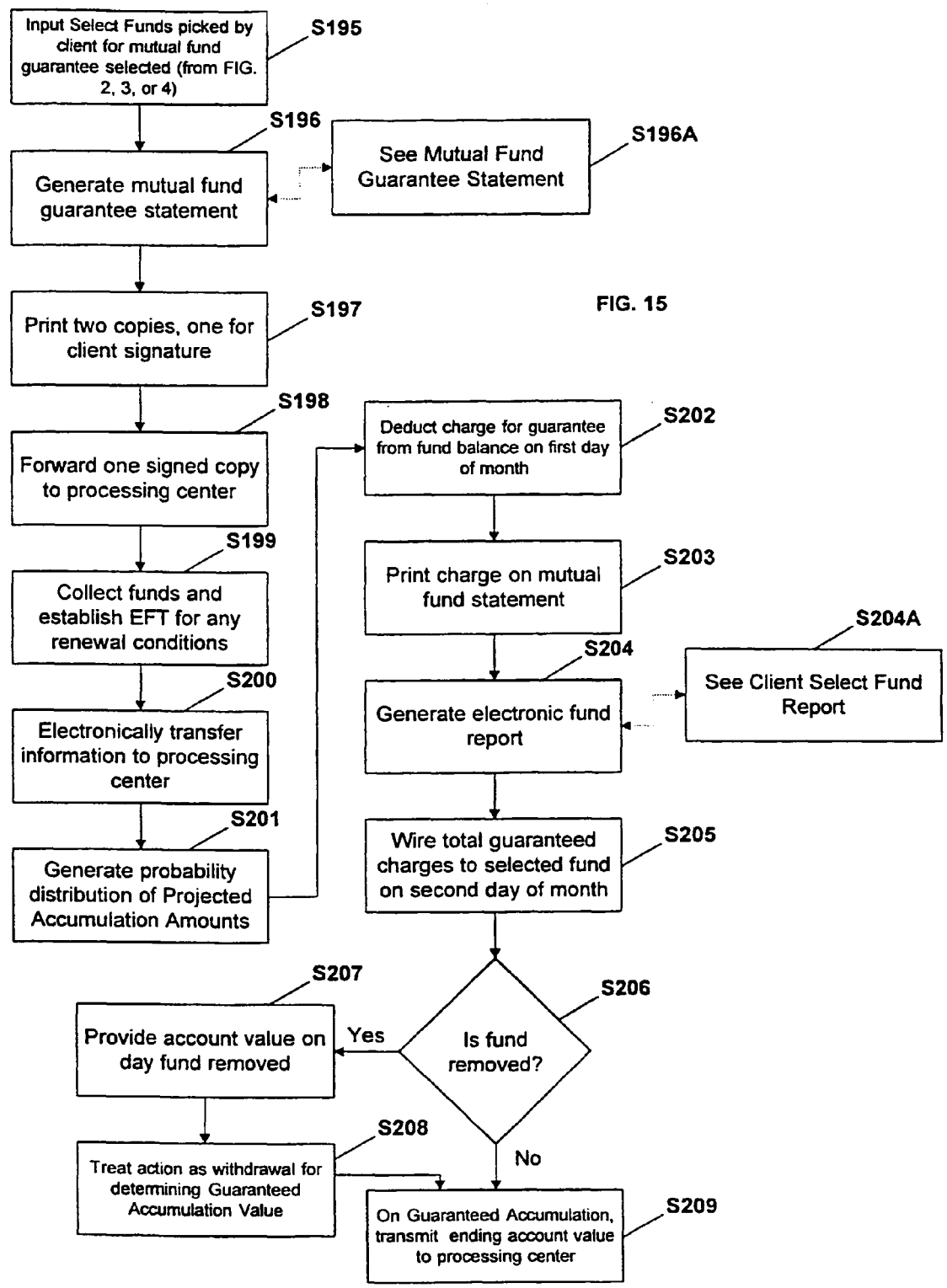
FIG. 15 presents a method for proposing, issuing, and processing the mutual fund accumulation guarantee for an embodiment of the present invention.

FIG. 15 presents a method for proposing, issuing, and processing the mutual fund accumulation guarantee for an embodiment of the present invention. In step 195, Select Funds picked by the client for the mutual fund guarantee selected (form FIG. 2, 3, or 4) are inputted. In step S196, a mutual fund guarantee statement is generated, including mutual fund guarantee statement information as described S196A). In step S197, two copies for client signature are printed.

In step S198, one signed copy of the statement is forwarded to the processing center. Funds are collected and an EFT for any renewal conditions are established in step S199. In step S200, collected information is electronically transferred to the processing center. In step S201, a probability distribution of projected accumulation amounts is generated. In step S202, a charge for the guarantee is deducted from the fund balance on the first day of the month. In step S203, the charge is printed on the mutual fund statement. In step S204, an electronic fund report is generated and electronically transferred to the processing center, including information from the Client Select Fund Report S204A. In step S205, the total guaranteed charges to the selected fund are wired on the second day of the month.

In step S206, it is determined if any fund has been removed by the client. If a fund has been removed, in step S207, an account value is provided on the day the fund is removed. In step S208, the removed fund action is treated as a withdrawal for determining guaranteed accumulation value. In step S209, on guaranteed accumulation, an ending account value is transmitted to the processing center.

Various functions of the processing center 20 are detailed in FIG. 15A. These functions include: 1) maintaining a master file 21; 2) combining electronic fund reports for each client 22; 3) after the first business day of the month, determining the current guaranteed accumulation value as of the end of the prior month 23; 4) at the end of the calendar year and upon request, generating and transferring to the client a total summary of all contributions and withdrawals, total fund values, and GAA 24; and 5) transmitting to the client 60 day notice of the guaranteed accumulation date.

Further processing steps for these functions include the following. For the function of combining electronic fund reports for each client, the process includes: 1) determining that all Select Funds specified by the client have reported 22A; 2) matching net transactions for terminated funds and client transfers among funds 22B; 3) determining whether fund diversification guidelines are met 22C; 4) if fund diversification guidelines are not met, providing the client with a timetable to reallocate 22D; 5) if fund diversification guidelines are met, generating withdrawal and deposit instructions for Select Funds using previous rules 22E; 6) determining whether total contributions exceed the amount listed in the mutual fund guarantee statement 22F; 7) if the total contributions exceed the amount listed in the mutual fund guarantee statement, generating a report to the client requesting excess contributions be withdrawn 22G; 8) providing the client with a timetable to withdraw 22H; and 9) if the timetable withdrawal is not met by the client, transferring the excess funds from the largest Select Fund to a newly opened non-guaranteed account with the same fund.

For the function of determining current guaranteed accumulation value as of the end of the prior month, the process includes: 1) comparing the current guaranteed accumulation value to the total account values of all Select Funds 23A; 2) transferring information electronically to the client's selected financial institution statement 23B; and 3) transferring the same information to a reserve file (see FIG. 18) 23C.

For the function of transmitting to the client 60 day notice of the guaranteed accumulation date, the process 25A includes the client options to: 1) select a new guarantee period; 2) ending the benefit and receiving the excess of the GAA over the total Select Fund account values; and 3) taking the greater value of options 1) and 2), less a VA commission, and purchasing the VA retirement income amount.

A method for proposing, issuing, and processing the VA GAA with a fixed retirement income guaranteed amount for an embodiment of the present invention will now be presented.

The VA GAA with a fixed retirement income guaranteed amount is contained in a VA rider called a guaranteed minimum income benefit (GMIB) rider. The final VA CIF discussed above is used to generate a proposal for this GMIB rider. In addition the actual contract data page is generated and signed by the client and IC. Information needed to produce this data page is taken from the VA CIF and/or inputted directly to the VA contract data page information file. This file is electronically transmitted to the processing center.

The VA contract data page information file includes the following: 1) policy number; 2) client name; 3) start date of GMIB rider; 4) rider charge (annual & daily); 5) initial contribution; 6) start date and mode of periodic contributions; 7) initial modal amount of periodic contributions; 8) annual percentage or flat dollar amount of increase in contribution; 9) stop date of periodic contributions; 10) contract annuity income date; 11) GAA; 12) contract annuitant name, birth date, and sex; 13) contract joint annuitant (if any) name, birth date, and sex; 14) if Norris sale, indicate that unisex calculation is used; 15) guaranteed minimum benefit, based on the premium pattern at issue.

At the processing center, the actual contract with GMIB rider is issued and mailed to the client.

For each VA Select Fund the cost of the charge for the guarantee is deducted on a daily basis. If the charge is 0.35% annually, the daily charge is 0.0000096 [or $(1+0.0035)^{(1/365)}-1$] times the Select Fund balance at the end of each day. The processing center deducts and accounts for this charge. No additional reports from the VA Select Funds are needed.

If a fund is removed from the VA Select Fund list, on the date the fund is removed, the amount is treated as a withdrawal in determining the VA Guaranteed Accumulation Value. If a fund has been terminated or a client has transferred the account value from one fund to another, this net transaction is matched.

Any switch of VA Select Funds is checked to ensure that the VA diversification guidelines are still met. If the diversification rules have been broken, the client is given a set number of days to reallocate funds. If not, the process automatically generates withdrawal and deposit instructions for the VA Select Funds using rules communicated to the client in advance. Also, if total contributions exceed the amount listed in the GMIB rider, a report is mailed to the client asking that the excess contribution be withdrawn. If the excess amount is not withdrawn within a set number of days and the total cumulative excess is greater than a pre-set amount (for example $1,000), the excess amount will be withdrawn from the largest VA Select Fund and used to open an account with the same fund for the client, only without the guarantee.

On each monthly contract anniversary, the process determines a current GAA and also compares that value to the total account values of all VA Select Funds. This information is electronically transferred to the client's selected information is financial institution statement (checking or savings account). This information is also passed to the reserve process discussed with regard to the method of establishing and maintaining reserves for the mutual fund and VA accumulation and cumulative VA retirement income amounts. At the end of the contract year (and upon request from the client), a total summary of all contributions and withdrawals from all Select Funds, the total fund values, and the VA GAA are printed and mailed to the client.

In calculating the VA GAA all considerations are accumulated on a daily interest basis at a 5% effective annual rate. For non-leap years, the daily compound factor is 1.0001337 (or $(1.05)^{(1/365)}$). For leap years, the factor is 1.0001333 (or $(1.05)^{(1/366)}$). Contributions are net of any sales loads. The monthly withdrawals to cover the cost of the guaranteed accumulation are not counted in the calculation. Other withdrawals (including withdrawal charges) are counted. Withdrawals are matched with contributions within the past 12 months, and for purposes of this calculation, the withdrawal is calculated from the date of the matched contribution. If any withdrawal amount is not matched with a contribution, it is given a date 12 months prior to the actual withdrawal. For example, a withdrawal of $2,000 is made on Mar. 17, 1997, and during the prior 12 months one contribution for $1,000 was made on Oct. 12, 1996; $1,000 of the withdrawal is dated Oct. 12, 1996, and the remaining $1,000 is dated Mar. 17, 1996.

Sixty days prior to the guaranteed accumulation date (immediate annuity start date) the client is sent a written notice of the coming event. The client is given the option of changing the retirement income benefit type and annuitant(s). On the guaranteed accumulation date (immediate annuity start date) the processing center determines the fixed retirement income guarantee amount versus the currently payable fixed retirement income amount based on Select Fund account values. The client receives the greater retirement income amount.

Figure 16:
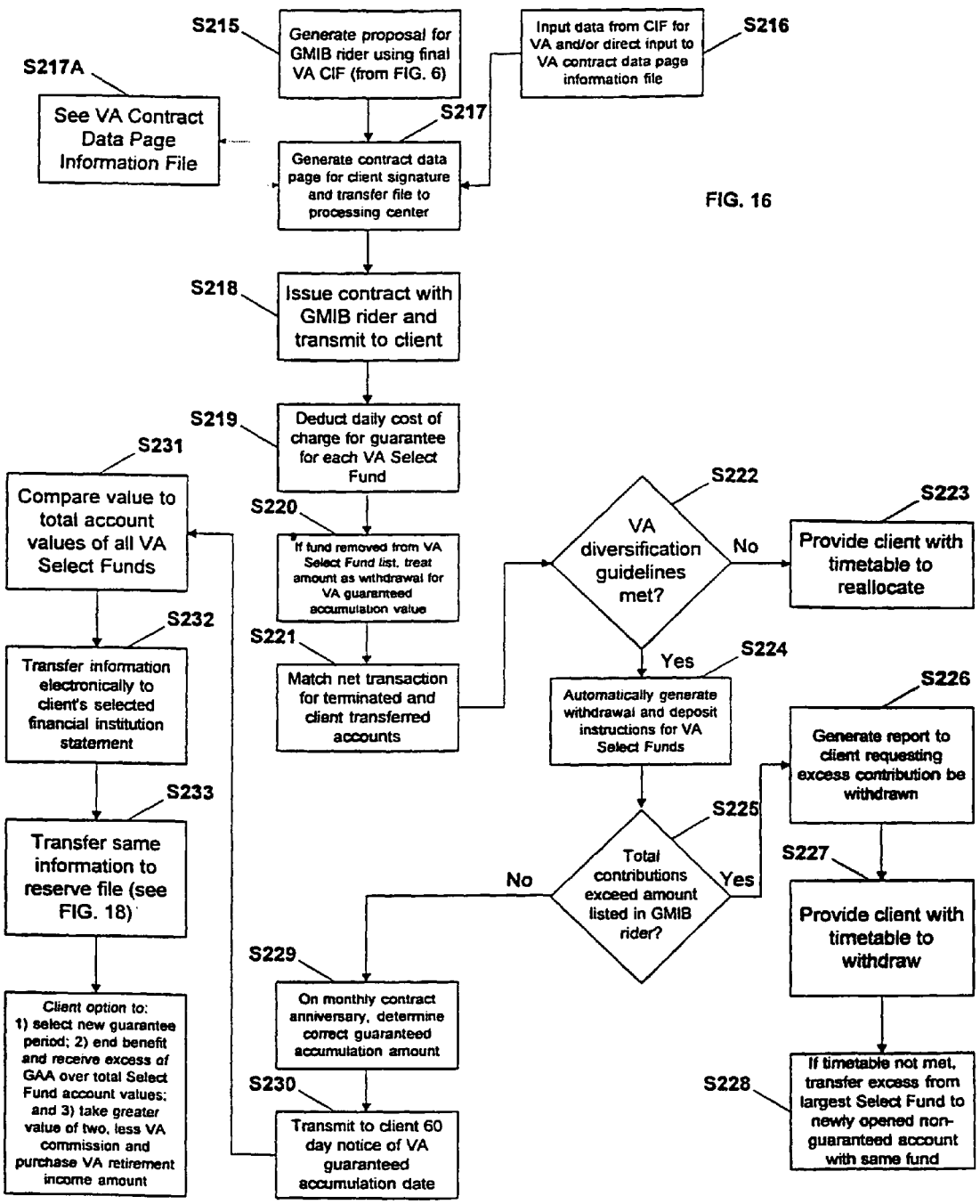
FIG. 16 contains a method for proposing, issuing, and processing the variable annuity guaranteed accumulation amount with a fixed retirement income guaranteed amount for an embodiment of the present invention.

FIG. 16 presents a method for proposing, issuing, and processing the VA GAA with a fixed retirement income guaranteed amount for an embodiment of the present invention. In step S215, a proposal for a GMIB rider using the final VA CIF (from FIG. 6) is generated. In step S216, data is input from the VA CIF and/or directly input to the VA contract data page information file. In step S217, a contract data page for client signature is generated, and the file is transferred to the processing center, for contract data page generation, information from the VA Contract Data Page Information File S217A is used.

In step S218, a contract with a GMIB rider is issued and transmitted to the client. In step S219, the daily cost of the charge for the guarantee for each VA Select Fund is deducted. In step S220, if a selected fund is removed from the VA Select Fund list, the amount of the removed fund is treated as a withdrawal for VA guaranteed accumulation value. In step S2221, the net transaction is matched for terminated and client transferred accounts. In step S222, it is determined whether VA diversification guidelines are met. If VA diversification guidelines are not met, in step S223, the client is provided with a timetable to reallocate. If the VA diversification guidelines are met, in step S224, withdrawal and deposit instructions for VA Select Funds are automatically generated.

In step S225, it is determined whether total contributions exceed the amount listed in the GMIB rider. If the amount is exceeded, in step S226, a report is generated to the client requesting that excess contributions be withdrawn. In step S227, the client is provided with a timetable to withdraw the excess contributions. In step S228, if the timetable to withdraw is not met, excess funds are transferred from the largest Select Fund to a newly opened non-guaranteed account with the same fund.

In step S225, if it is determined that the total contributions do not exceed the amount listed in the GMIB rider, the method proceeds to step S229. In step S229, on the monthly contract anniversary, the correct guaranteed accumulation amount is determined. In step S230, the client is transmitted a 60 day notice of the VA guaranteed accumulation date. In step S231, the guaranteed accumulation value is compared to the total account values of all VA Select Funds. In step S232, the comparison information is electronically transferred to the client's selected financial institution statement. In step S233, the same information is transferred to the reserve file (see FIG. 18). In step S234, the client receives the options of: 1) selecting a new guarantee period; 2) ending the benefit and receiving the excess of the GAA over the total Select Fund account values; and 3) taking the greater value of the two, less VA commission, and purchasing a VA retirement income amount.

A method for proposing, issuing, and processing the guaranteed cumulative VA retirement income amount for an embodiment of the present invention will now be described.

The proposal is made to the client using the process outlined above with regard to the method for determining a guaranteed cumulative VA retirement income amount. Since this benefit is not finally elected until retirement, a re-proposal is made 60 days prior to the guaranteed accumulation date (immediate annuity start date) and mailed to the client by the processing center.

If the client elects the benefit, a guaranteed minimum variable income benefit (GMVIB) rider is created and mailed to the client by the processing center. This GMVIB rider can be added to an existing VA contract, or, if the client is purchasing the annuity contract at the same time, both the contract and the rider are generated and mailed to the client. The client elects an annuity benefit with at least a 10 year certain period and elects to use 5% (in this example) for the assumed interest rate. The resulting guaranteed monthly benefit and the annual (and daily factor) charge for the guarantee are displayed on a Contract Data Page. These values are also retained in the processing center administrative systems.

During the guaranteed payout period (10 years or more), the total actual benefit payments made are compared with the total benefits that would have been payable using the annuity benefit amount based on the 5% interest factor. These amounts are communicated to the client by the processing center as part of the annual statement generated at the end of each contract year. These two values are stored on the processing system and updated after each benefit payment. They are communicated to the client upon request.

At the end of the guaranteed payout period (10 years or more) and each year thereafter, the total actual benefit payments made are compared with the total benefits that would have been payable using the annuity benefit amount based on the 5% interest factor. If the actual benefit payments are less than the 5% of the guaranteed benefit totals, the difference is paid to the annuitant(s) at the end of the contract year, and added to the total benefit paid amount. This process continues for the duration of the retirement income benefit.

Figure 17:
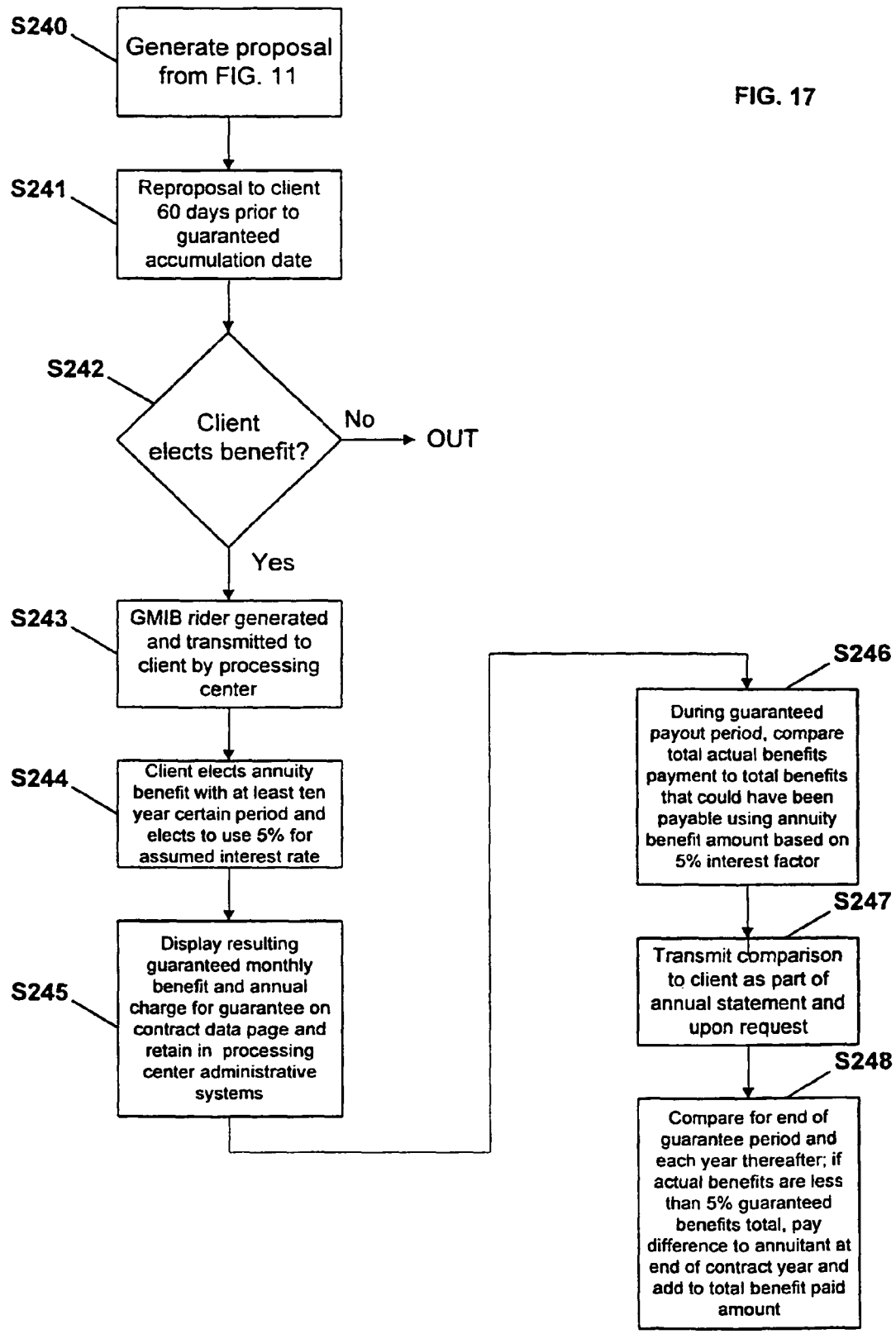
FIG. 17 shows a method for proposing, issuing, and processing the guaranteed cumulative variable annuity retirement income amount for an embodiment of the present invention.

FIG. 17 presents a method for proposing, issuing, and processing the guaranteed cumulative VA retirement income amount for an embodiment of the present invention. In step S240, a proposal is generated using the method shown in FIG. 11. In step S241, reproposal is made to the client 0 days prior to the guaranteed accumulation date. In step S242, the client elects or does not elect the benefit. If the client does not elect the benefit, the method is exited. If the client elects the benefit, the method proceeds to step S243. In step S243, a GMB rider is generated and transmitted to the client by the processing center.

In step S244, the client elects, an annuity benefit with at least a ten year certain period and elects, for example, to use 5% for the assumed interest rate. In step S245, the resulting guaranteed monthly benefit and the annual charge for the guarantee are displayed on the contract data page and retained in the processing center administrative systems. In step S246, during the guaranteed payout period, the total actual benefits payment is compared to the total benefits that could have been payable using an annuity benefit amount based on a 5% interest factor. In step S247, the comparison is transmitted to the client as part of an annual statement and upon request. In step S248, the comparison is made for the end of the guarantee period and each year thereafter; if the actual benefits are less than 5% of the guaranteed benefits total, the difference is paid to the annuitant at the end of the contract year and added to the total benefit paid amount.

A method for establishing and maintaining reserves for the mutual fund and VA accumulation and cumulative VA retirement income amounts for an embodiment of the present invention will now be described.

Multiple reserve methods are used on a monthly basis to analyze the projected cost of the guarantee less projected. The reserve established each month is the highest value produced by any method (using a 90% probability figure from Reserve Method 2 and an 85% probability figure from Reserve Method 3).

Each of these reserve methods will now be described in greater detail.

In Reserve Method 1, for each client where the total Select Fund or VA Select Fund account values are less than the current GAA, the difference is stored and totaled for all clients. This value is then increased by an additional reserve factor (for example, 10%).

Figure 18A:
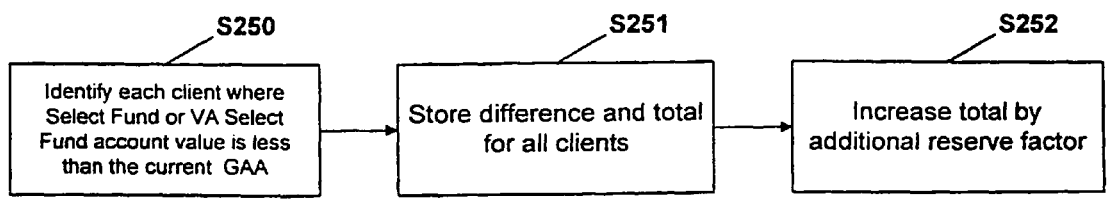

FIG. 18A presents Reserve Method 1. In step S250, each client having a Select Fund or VA Select Fund account value less than the current guaranteed accumulation amount is identified. In step S251, the difference is stored and totaled for all clients. In step S252, the total is increased by an additional reserve factor.

Reserve Method 2 starts with the current Select Fund or VA Select Fund value and projects the value to the guaranteed maturity date using Projection Method 3. For the VA benefit, the projection of the guaranteed retirement benefit through retirement years calculated at 5% is discounted by the SPIA reserve interest rate established at issue. For the mutual fund benefit, the guaranteed accumulation value is discounted back to the valuation date using the net investment rate currently earned on the reserve. This process is completed for each scenario, and the value of the discounted accumulation less the current Select Fund or VA Select Fund account values is tabulated. The present value of future guarantee charges assuming no additional contributions is subtracted from the calculated value. The resulting probability distribution is stored, printed and various outcomes are highlighted, such as the median value, and values at 70%, 80%, 90% and 95% probability.

Figure 18B:
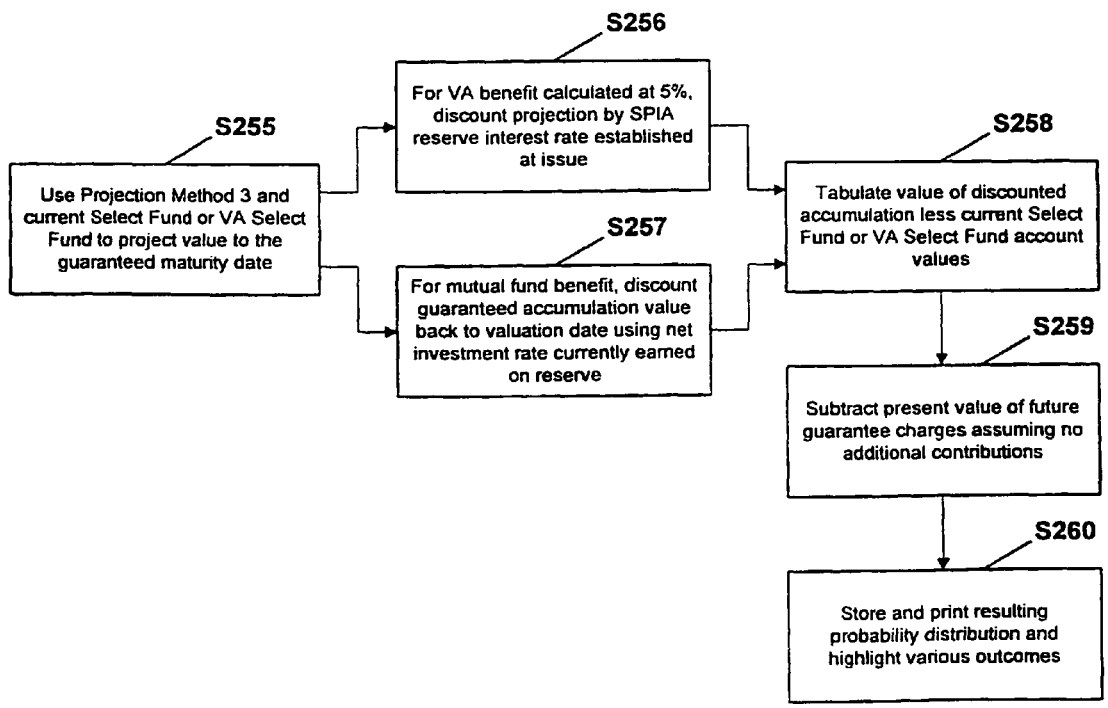

FIG. 18B presents Reserve Method 2. In step S255, Projection Method 3 and the current Select Fund or VA Select Fund are used to project value to the guaranteed maturity date. In step S256, for VA benefits calculated at 5%, the projection is discounted by the SPIA reserve interest rate established at issue. In step S257, for mutual fund benefits, the guaranteed accumulation value is discounted back to valuation date using the net investment rate currently earned on reserve. In step S258, the value of discounted accumulation less current Select Fund or VA Select Fund account values is tabulated. In step S259, the present value of future guarantee charges assuming no additional contributions are subtracted. In step S260, the resulting probability distribution is stored and printed, and various outcomes are highlighted.

Reserve Method 3 is similar to Reserve Method 2 except Projection Method 4 is used and the index performance for the next three years is either held at no gain (or projected to decrease by 5%).

Figure 18C:
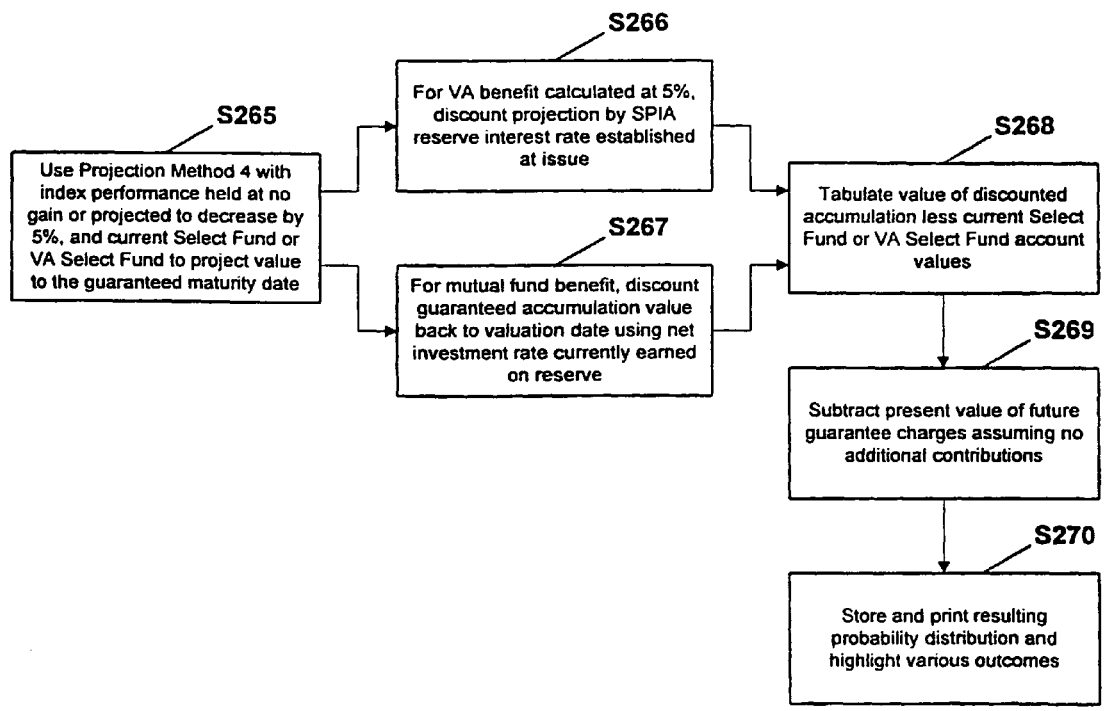

FIG. 18C presents Reserve Method 3. In step S265, Projection Method 4, with index performance held at no gain or projected to decrease by 5%, and the current Select Fund or VA Select Fund are used to project value to the guaranteed maturity date. In step S266, for VA benefits calculated at 5%, the projection is discounted by the SPIA reserve interest rate established at issue. In step S267, for mutual fund benefits, the guaranteed accumulation value is discounted back to valuation date using the net investment rate currently earned on reserve. In step S268, the value of discounted accumulation less current Select Fund or VA Select Fund account values is tabulated. In step S269, the present value of future guarantee charges assuming no additional contributions are subtracted. In step S270, the resulting probability distribution is stored and printed, and various outcomes are highlighted.

Reserve Method 4 is used only for the VA Benefit and uses the industry standard valuation of VA benefits described in proposed NAIC valuation guideline XXXIII.

FIG. 18D presents Reserve Method 4. In step S275, industry standard valuation of VA benefits are used, as described in proposed NAIC valuation guideline XXXIII.

Alternative embodiments of aspects of the present invention will now be described.

Alternate simulation methods are usable in place of the Monte Carlo method.

The data available for specific Select Funds are usable where they prove to be a better fit for alternate distributions, such as the binomial, Poisson, hypergeometric, and lognormal in preference to the normal distribution.

In an embodiment of the present invention, this process is used as an alternate funding method for Social Security retirement benefits. Much current discussion centers on allowing younger workers to establish self-directed "IRA Type" accounts funded from their portion of Social Security contributions. This process eliminates one of the major current negative aspects of self-directed savings by establishing a minimum return for mutual fund investments. Because of the potential size of Social Security self-directed investments, the financial institutions that provide the fund performance guarantee have a need to purchase catastrophe reinsurance from the government. While the prospect of a major loss is extremely small, financial institutions do not have the resources to cover such an event, so the government must sell catastrophe reinsurance coverage in order to fully guarantee the success of such a program.

In both the Select Fund and the VA Select Fund files, the duration of the current fund manager is listable. Also, for each Select Fund or VA Select Fund a listing of actual annual yields are maintainable. For the particular Select Fund or VA Select Fund chosen by the IC and client, the number of years of past experience are selectable for use in determining average yield and performance against the specified index for the fund. This modification is very useful if the new fund manager has demonstrated substantially different performance results than the prior managers.

Embodiments of the present invention have now been described in fulfillment of the above objects. It will be appreciated that these examples are merely illustrative of the invention. Many variations and modifications will be apparent to those skilled in the art.

What is claimed is:

1. A computer implemented method for projecting an accumulated investment amount for a portfolio having a plurality of funds over a preselected time period comprising the steps of:
  determining the total numbers of years in the preselected time period;
  inputting initial and periodic contributions and fund allocations for the plurality of funds;
  generating, by a computer, a projection random number starting point for an initial year in the preselected time period;
  completing, and storing in a computer-readable medium, a projection method parameters file identifying a plurality of parameters including a standard deviation of return for the plurality of funds, an average yield for the plurality of funds, and a probability that the average yield for the plurality of funds will exceed a projected yield in any year;
  generating, by said computer, a random number starting point for a subsequent year in the preselected time period based upon the random number starting point for the initial year; and
  automatically performing, by said computer, the projection of the accumulated investment amount for the portfolio having the plurality of funds based on the total numbers of years in the preselected time period; the initial and periodic contributions and fund allocations for the plurality of funds; the random number starting points; and the plurality of parameters identified in the projection method parameters file:
  wherein the step of automatically performing a projection of the accumulation amount for the plurality of funds further comprises the steps of:
    (a) inputting a number of scenarios and number of simulations;
    (b) automatically generating a random number for a simulation;
    (c) automatically generating a simulation result based at least on the random number;
    (d) automatically repeating steps b and c a number of times equal to the number of simulations inputted less two simulations to generate an average yield for each of a plurality of funds; and
    (e) automatically calculating the average projected yield for each of the plurality of funds by subtracting a service charge from the average yield for each of the plurality of funds.

2. The method of claim 1 wherein the plurality of funds comprises select funds.

3. The method of claim 1 wherein the plurality of funds comprises variable annuities.

4. The method of claim 1 further comprising the step of:
if the user interrupts the step of automatically performing a projection of the accumulation amount for the plurality of funds, automatically presenting completed projections.

5. The method of claim 1 further comprising the step of: automatically prompting the user prior to performing the step of automatically calculating a projection completion time.

6. The method of claim 1 wherein the step of automatically performing a projection of the accumulation amount for the plurality of funds further comprises the steps of: inputting the average yield for each of the plurality of funds;
automatically deducting a service charge; and
automatically calculating the average projected yield for each of the plurality of funds.

7. The method of claim 1 wherein the step of automatically performing a projection of the accumulation amount for the plurality of funds further comprises the steps of:
inputting data for the projection;
and automatically performing a distribution model.

8. The method of claim 7 wherein the step of automatically performing a distribution model further comprises the steps of:
(a) inputting a number of scenarios and number of simulations;
(b) automatically generating a random number for a first simulation;
(c) inputting projection method factors;
(d) automatically generating a first simulation result for a random distribution model;
(e) automatically generating a new random number from the first random number;
(f) automatically generating a new simulation result for the random distribution model;
(g) automatically repeating steps e and f a number of times equal to the number of simulations inputted less two simulations;
(h) automatically inputting the output of step g as the average yield for each of a plurality of funds;
(i) automatically deducting a service charge; and
(j) automatically calculating the average projected yield for each of the plurality of funds;
(k) automatically generating a first simulation result for the random distribution model for a new simulation; and
(l) automatically repeating steps e through j a number of times equal to the number of scenarios inputted less one scenario to produce outcomes for each of the plurality of scenarios.

9. The method of claim 7 wherein the random distribution simulation includes a Monte Carlo simulation.

10. The method of claim 7 further comprising the steps of:
automatically determining the accumulated investment amount for the preselected time period;
automatically discounting the accumulated investment amount by a predetermined reserve interest rate;
automatically discounting the accumulated investment amount using a reserve investment rate;
automatically tabulating the discounted accumulated investment amount less an account value for each of the plurality of funds;
automatically determining a present value of a future guarantee charge for the accumulated investment amount; and
automatically subtracting the present value of the future guarantee charge for the accumulated investment amount from the accumulated investment amount.

11. The method of claim 1 wherein the step of automatically performing a projection of the accumulation amount for the plurality of funds further comprises the steps of:
inputting data for the projection;
setting yield equal to the index performance for a predetermined number of simulations; and
automatically performing a distribution model for the number of simulations greater than the predetermined number.

12. The method of claim 11 further comprising the steps of:
inputting a predetermined index performance limit and a mix of selected funds;
automatically determining the accumulated investment amount for the preselected time period;
automatically discounting the accumulated investment amount by a predetermined reserve interest rate;
automatically discounting the accumulated investment amount using a reserve investment rate;
automatically tabulating the discounted accumulated investment amount less an account value for each of the plurality of funds;
automatically determining a present value of a future guarantee charge for the accumulated investment amount; and
automatically subtracting the present value of the future guarantee charge for the accumulated investment amount from the accumulated investment amount.

13. The method of claim 1 wherein the step of automatically performing a projection of the accumulation amount for the plurality of funds further comprising the steps of:
inputting an average annual change in index performance for each index fund and a standard deviation for the average annual change in index performance;
automatically performing a normal distribution random projection of annual index appreciation;
automatically deducting a predetermined percentage of annual yield from the projection of annual index appreciation;
automatically performing a distribution model to generate multiple accumulation amounts.

14. The method of claim 13 wherein the plurality of funds includes at least one index fund.

* * * * *